US010462678B2

(12) United States Patent
Ashrafi

(10) Patent No.: US 10,462,678 B2
(45) Date of Patent: Oct. 29, 2019

(54) UNIFIED CLOUD-BASED CORE NETWORK SUPPORTING MULTIPLE PRIVATE CBRS NETWORKS OF MULTIPLE OPERATORS WITH NETWORK SLICING

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

(21) Appl. No.: 15/823,073

(22) Filed: Nov. 27, 2017

(65) Prior Publication Data
US 2019/0166506 A1    May 30, 2019

(51) Int. Cl.
| | |
|---|---|
| *H04W 16/24* | (2009.01) |
| *H04M 15/00* | (2006.01) |
| *H04B 1/00* | (2006.01) |
| *H04W 12/06* | (2009.01) |
| *H04W 8/04* | (2009.01) |

(52) U.S. Cl.
CPC .......... *H04W 16/24* (2013.01); *H04B 1/0003* (2013.01); *H04M 15/66* (2013.01); *H04W 8/04* (2013.01); *H04W 12/06* (2013.01)

(58) Field of Classification Search
CPC ....... H04W 16/24; H04W 8/04; H04W 12/06; H04B 1/0003; H04M 15/66
See application file for complete search history.

(56) References Cited

U.S. PATENT DOCUMENTS

| | | | | |
|---|---|---|---|---|
| 9,762,402 | B2 * | 9/2017 | Batz | H04L 12/1407 |
| 10,027,760 | B2 * | 7/2018 | Renzullo | H04L 67/14 |
| 10,172,009 | B1 * | 1/2019 | Altay | H04W 16/04 |
| 2011/0211585 | A1 * | 9/2011 | Kodaka | H04L 45/00 |
| | | | | 370/401 |
| 2016/0135175 | A1 * | 5/2016 | Tarlazzi | H04W 28/08 |
| | | | | 370/329 |
| 2016/0295408 | A1 * | 10/2016 | Chen | H04W 4/90 |
| 2017/0164349 | A1 * | 6/2017 | Zhu | H04W 48/18 |
| 2017/0332421 | A1 * | 11/2017 | Sternberg | H04W 76/11 |
| 2018/0041905 | A1 * | 2/2018 | Ashrafi | H04W 16/10 |
| 2018/0139109 | A1 * | 5/2018 | Zuerner | H04L 41/5051 |
| 2018/0212837 | A1 * | 7/2018 | Kalluri | H04L 41/16 |
| 2018/0242198 | A1 * | 8/2018 | Choi | H04W 28/18 |

(Continued)

OTHER PUBLICATIONS

Papidas, A. G., Network Functions Virtualization (NFV) for Mobile Networks, Athens University of Economics and Business, MSc. Thesis, Department of Informations (MSc) in Information Systems, Athens, Jun. 2016, 81 pages.

(Continued)

*Primary Examiner* — Magdi Elhag
(74) *Attorney, Agent, or Firm* — Richard H. Krukar; Kermit D. Lopez; Luis M. Ortiz

(57) ABSTRACT

A unified core network provides core network services to a number of telecommunications network operators. The unified core is partitioned into a number of slices with each slice being the core network for a network operator. Each network operator is then free to define services within its own partition to serve its own users. In this manner, the network operators are freed from building and maintaining a core network while simultaneously enjoying the benefit of having a core network.

20 Claims, 11 Drawing Sheets

(56) References Cited

U.S. PATENT DOCUMENTS

| | | | | |
|---|---|---|---|---|
| 2018/0242304 | A1* | 8/2018 | Rong | H04W 28/0247 |
| 2018/0287891 | A1* | 10/2018 | Shaw | H04L 67/322 |
| 2018/0316564 | A1* | 11/2018 | Senarath | H04L 41/0893 |
| 2018/0324576 | A1* | 11/2018 | Salkintzis | H04W 8/02 |
| 2018/0343567 | A1* | 11/2018 | Ashrafi | H04L 67/10 |
| 2018/0359337 | A1* | 12/2018 | Kodaypak | H04L 67/18 |
| 2018/0367997 | A1* | 12/2018 | Shaw | H04W 12/08 |
| 2019/0007899 | A1* | 1/2019 | Vrzic | H04W 48/18 |
| 2019/0075511 | A1* | 3/2019 | Ryu | H04W 48/04 |

OTHER PUBLICATIONS

3rd Generation Partnership Project; Technical Specification Group Services and System Aspects; Network architecture (Release 14), 3GPP TS 23.002 V14.1.0 (Mar. 2017) Technical Specification, 3GPP A Global Initiative, 114 pages.

3rd Generation Partnership Project; Technical Specification Group Services and System Aspects; IP Multimedia Subsystem (IMS); Stage 2 (Release 15), 3GGP TS 23.2228 V15.0.0 (Sep. 2017), Technical Specification, 3GPP A Global Initiative, 326 pages.

3rd Generation Partnership Project; Technical Specification Group Services and System Aspects; General Packet Radio Service (GPRS) enhancements for Evolved Universal Terrestrial Radio Access Network (E-UTRAN) access (Release 15), 3GPP TS 23.401 V15.1.0 (Sep. 2017) Technical Specification, 3GPP A Global Initiative, 397 pages.

De La Oliva, A. et al., An overview of the CPRI specification and its application to C-RAN based LTE scenarios, IEEE Communications Magazine (2016) 54(2):152-159.

Brown, G., White Paper Exlporing 5G New Radio: Use Cases, Capabilities & Timeline, Qualcomm, Sep. 2016, 13 pages.

Kottapalli, N., Diameter and LTE Evolved Packet System, White Paper Radisys, Sep. 2011, 10 pages.

Metzler, J., The 2015 Guide to SDN and NFV, Webtorials, Jan. 2015, 78 pages.

Munoz, R., Integrating verticals with the 5G communications network for E2E experimentation, Centre Tecnologic de Telecomunicacions de Catalunya (CTTC), Joint Expert Group and 5G Vision Working Group Workshops, Mar. 16, 2016, Bologna, Italy, 10 pages.

SDN, NFV, and All That, IETF News, Jul. 2015, 26 pages.

Lema, M. et al., Chapter 13: NFV and SDN for fronthaul based systems, Access, Fronthaul and Backhaul Networks for 5G & Beyond, Aug. 2017, 14 pages.

Ahmadi, S., Future of Wireless Networks: SDN/NFV, MEC and Network Slicing, XILINX, Jun. 8, 2016, 17 pages.

Universal Mobile Telecommunications Sysem (UMTS); LTE; Evolved Packet Systems (EPS); 3GPP EPS AAA Interfaces (3GPP TS 29.273 version 14.3.0 Release 14) (Jul. 2017), 215 pages.

* cited by examiner

UNIFIED CLOUD-BASED CORE NETWORK SUPPORTING MULTIPLE PRIVATE CBRS NETWORKS OF MULTIPLE OPERATORS WITH NETWORK SLICING

TECHNICAL FIELD

Embodiments are generally related to wireless communication, cellular telephone networks, WiFi networks, telecommunications, software defined radios, software defined networks, network function virtualization, virtual machines, and containerized applications.

BACKGROUND

Wireless communications providers are adding capabilities to their networks in order to meet current and projected demand for new and advanced services. In comparison to services that are currently deployed widely, the services are expected to have requirements for lower latency, higher reliability, higher bandwidth, massive connection density, and lower energy use. In considering these needs, three representative service categories have been defined: enhanced mobile broadband (eMBB); ultra-reliable and low latency communications (uRLLC); and massive machine type communications (mMTC). In general, real world use cases are not purely eMBB, uRLLC, or mMTC, but rely on a mixture of the properties of the three. eMBB largely relates to bandwidth, the amount of data that can be transmitted in any given time period. uRLLC largely relates to how quickly data is guaranteed to reach a destination. mMTC relates largely to fully automatic data generation, processing, exchange, and actuation between machines.

FIG. 1, labeled as Prior Art, illustrates real world use cases in the context of eMBB 100, uRLLC 102, and mMTC 101. Bulk data transfer 108 requires massive bandwidth but does not require low latency or high reliability. Viewing of ultra-high definition (UHD) video or 3D video 111 requires massive bandwidth with some reliability and latency requirements and is therefore closer to the eMBB vertex. Smart cities 104, with their plethora of "internet of things" (IOT) devices exemplified by interacting sensors triggering a staggering number of messages, machine interactions, and automated actions are located near the mMTC vertex. Self-driving cars 107 are expected to be particularly reliant on fast and reliable messaging and are therefore closer to the uRLLC vertex. Mission critical IOT 106 can be characterized as low latency, reliable, and massive machine to machine communications. Industry automation 105 can be viewed as communications similar to mission critical IOT, but with more relaxed timing and reliability needs but higher data needs, perhaps for interfacing with humans. Voice/video communications 109, gaming 110, and UHD/3D video 111 are illustrated as clumped together because they all involve communication to or with a human. Human to human communication (voice/video communications 109) have latency/reliability requirements because people are responsive and tend to rely on feedback. Gaming 110 is shown as needing more data bandwidth than voice/video comms 109 but has similar latency/reliability requirements. UHD/3D video viewing certainly requires high bandwidth while caching on at or near the display device results in relaxed latency and reliability requirements. Note that FIG. 1 and the related discussion are intended to be qualitative presentations of representative 5G communications services.

To provide these services, service providers are adapting their infrastructure. Large service providers, such as nation-wide providers offering data and voice services, have core networks coupled to a locally deployed radio access networks (RANs). The core networks move data and orchestrate the movement of data based on a number of factors such as the class and quality of service promised to end users, movement of users between communications cells, and network availability. For example, uRLLC data can take priority over eMBB data while data for a low bandwidth customer can be throttled down regardless of network utilization. The RANs wirelessly communicate with user equipment (UE) such as cell phones, smart phones, IOT devices, and other equipment.

FIG. 2, labeled as Prior Art, illustrates a simple RAN. In accordance with recent deployments, the radio functions have been split between a remote radio unit (RRU) 202 and a baseband unit (BBU) 204. The RRU 202 performs basic over-the-air analog radio functions by transmitting signals directly to and receiving signals directly from user equipment (UE) 201. The BBU 204 performs control functions and handles baseband digital signals. The RRU 202 and the BBU 204 can be many kilometers apart and can communicate with a standardized digital protocol, such as CIPR, carried by a front haul 203. CIPR is a transport layer protocol that can be carried by data networks. As such, front haul 203 can be an optical fiber or part of an optical fiber network carrying CIPR data from collocated BBUs to geographically disperse RRUs. Similarly, WiFi can carry CIPR between an RRU and BBU, although such use cases may seem unusual when the RRU/BBU is part of an LTE network. The BBU 204 is connected to a service provider's core network 206 by a backhaul 205. Those familiar with current 4G and LTE communications systems are knowledgeable of the concepts described in this paragraph.

Software defined radio (SDR) technologies have changed RAN architecture. In the past, a radio unit connected the user equipment to the core network. Eventually, the radio unit was split into RRU and BBU although both RRU and BBU were often both deployed at a cell site. The split RRU and BBU exemplify SDR because the BBU can operate in the digital realm and produce digital baseband signals while the RRU translates the digital baseband signals to analog signals at the desired carrier frequency. The separate units allowed the RRU to be hardened and placed close to the antenna while the BBU could be kept inside a cooled structure. Further developments collocated the specialized BBUs into central locations where they were easier to maintain with front hauls connecting BBU to RRU.

SDR splits the analog radio functions from the control functions of a radio. The control functions can be performed by a base band unit (BBU) while the analog radio functions can be performed by a remote radio unit (RRU). Recently, virtual RAN (V-RAN) uses commodity hardware to run BBUs. For example, a normal commercially available desktop or server computer can be repurposed to run virtualized BBUs. A further advance is that the commodity hardware can instantiate virtual machines (VMs) or containers running virtual BBUs. Virtual machines and containers have been central to the management and scaling of large software deployments and cloud based applications. Although the BBUs can be virtualized, the RRUs are, by necessity, specialized devices having analog transmitters, receivers, antennas, and the like.

FIG. 3, labeled as Prior Art, is an illustrative example of a traditional present day telecommunications system core network. The term "core network" is a term of art for telecommunications providers. The core network is the heart of each provider's operations with each provider having its own core network and having dedicated personnel and resources for maintaining and configuring the core network. As can be appreciated from FIG. 3, core networks have been and continue to evolve and are extremely complex. Telecommunications providers are constantly growing and re-engineering their networks to gain competitive advantage. Meanwhile, the core networks are huge. In the US, it is not unusual for a core network to simultaneously provide services to tens of millions of customers located throughout the nation.

LTE (Long Term Evolution) generally refers to a set of standards specifying protocols for digital cellular networks published by the 3rd generation Partnership Project (3GPP) which is a collaboration between groups of telecommunications. In the figures, an element labeled "3GPP" is understood to represent communications equipment conforming to one or more of the 3GPP communications standards. Non-3GPP standards are standards that have not been specified by the 3GPP, such as WiFi. In the context of a provider's core network, such as that of FIG. 3, non-3GPP equipment is either trusted or it is not trusted and the decision to trust is made by the provider. For example, a provider can determine that certain WiFi equipment is trusted non-3GPP equipment while other WiFi equipment is untrusted non-3GPP equipment. Trusted non-3GPP equipment can have having direct access to the provider's core network. Untrusted non-3GPP equipment should not have direct access to the providers core but can have indirect access by way of an evolved packet data gateway (ePDG). The ePDG secures the data transmission between the provider's core network and UE connected over untrusted non-3GPP equipment.

FIG. 4, labeled as Prior Art, illustrates a present day information technology (IT) network 400 that can be used for voice, video, and data communications. The central portion of the network is the TCP/IP/UDP services 401 provided by various layer 2 and layer 3 devices. IP, internet protocol, is the notoriously well-known and common layer 3 (network layer) protocol that passes data packets between source and destination machines, often transiting routers, switches, and other layer 3 and layer 2 devices along the way. TCP and UDP are notoriously well known layer 4 (transport layer) protocols. TCP is directed to the reliable transport of data streams between connection endpoints while UDP is directed to connectionless and unreliable transport of packets. Here, the network layers are referenced using the well-known OSI model with transport layer protocols layered over network layer protocols. For example, TCP and UDP packets are often transported within IP packets. The Internet Engineering Task Force (IETF) has standardized many communications protocols via its Request For Comment (RFC) mechanism. In 1981, version 4 of IP (IPv4) is described in RFC 791. UDP is documented in RFC 768. TCP is documented RFC 793. Later RFCs have refined and built upon the various protocols described herein.

Dynamic Host Configuration Protocol (DHCP) services 405 are typically provided by one or more DHCP servers. DHCP is a standardized network protocol used on Internet Protocol (IP) networks. The DHCP servers dynamically distribute network configuration parameters, such as IP addresses, for interfaces and services. A commodity computer, a router, a residential gateway, or other device running appropriate software can be enabled to act as a DHCP server. DHCP is described in RFC 1541.

Session Initiation Protocol (SIP) is a layer 7 (application layer) communications protocol for signaling and controlling multimedia communication sessions in applications of Internet telephony for voice and video calls, in private IP telephone systems, in instant messaging applications, and related communications. SIP services 401 can be provided by applications and devices communicating over TCP, UDP, and other layer 3 protocols. SIP is important in the context of this disclosure because it arose from the internet community whereas other voice and video communications protocol.

Web Real Time Communication (WebRTC) services 403 can be provided using various communications protocols and Application Programming Interfaces (APIs) for real time communications over peer-to-peer connections. WebRTC can use the layer 7 Real Time Transport (RTP) protocol described in RFC 3550 and is being standardized by the IETF and the World Wide Web Consortium (W3C) The applications enabled by WebRTC include video conferencing, file transfer, chat, and desktop sharing. WebRTC services can be provided by application running on smart phones or commodity computers. For example, recent web browsers support WebRTC. Server side streaming programs can also provide WebRTC services by streaming video and other content.

Many IT type networks, such as that of FIG. 4, are currently undergoing radical architectural changes due to software defined networking (SDN) and network function virtualization (NFV). SDN refers to the separation of the control plane and data plane in a network. The data plane is the fabric over which data is switched and transported. The control plane is responsible for instructing the data plane such that the data is properly sent to its destination. Before SDN, network hardware was expensive and proprietary equipment requiring specialists for configuration and management. With SDN, the data plane can consist of simple devices that switch data from path based on instructions received from the control plane. A standardized protocol such as OpenFlow can carry the instructions between the devices in the control and data layers of a software defined network.

FIG. 5, labeled as Prior Art, illustrates a software defined network (SDN) 500. SDN 500 can host numerous SDN applications such as SDN Application 1 501, SDN Application 2 502, and SDN Application 3 503. An example of an SDN application is a VLAN. A Local Area Network (LAN) is a physical network connecting numerous local devices such as computers, printers, IOT devices, etc. A VLAN mimics a LAN such that the devices can be configured as if they are local to one another even if they a distant. Those familiar with computer networks are familiar with LANs and VLANs. RFC 2674, dated August 1999, discusses VLANs.

The SDN applications can communicate with SDN Controller 504 over North Bound Interface (NBI) 510. Here, the NBI refers to the communications means generally wherein properly formatted data is communicated between SDN Application and SDN Controller. For example, the communications can be an application layer protocol running over IP or can be an API with HTTP, HTTPS, or JSON API calls over TCP. SDN controller 504 can configure the SDN data plane based on requests from the SDN applications 501, 502, 503. SDN controller 504 can communicate with the SDN data plane 511 over SDN Control-Data-Plane-Interface (CDPI) 509.

The SDN data plane 511 is illustrated as having two network elements with each network element providing a data path. Network element 1 505 provides SDN datapath 1 506 while network element 2 507 provides SDN datapath 508. As an example, the network elements 505, 506 can be specialized high speed optical switches providing high speed datapaths over optical fiber to the SDN applications. Note, those practiced in networking and communications realize that physical layer elements such as optical fiber, antennas, and cabling are inherent in the descriptions throughout this disclosure.

FIG. 6, labeled as Prior Art, illustrates a network 600 enhanced with network function virtualization (NFV). Comparing FIG. 5 to FIG. 6, it is seen that many of the network functions of FIG. 5 have been virtualized in FIG. 6. Commodity hardware 601 is running four virtual machines (VMs). As disclosed throughout this application, the VMs discussed throughout this disclosure refer generally to virtualized hardware (hardware virtualization) and to containers running containerized applications. Those practiced in the arts of cloud computing or large application deployment and operation are knowledgeable of hardware virtualization, Operating System (OS) level virtualization, desktop virtualization, application virtualization, and network virtualization.

Hardware virtualization is the creation of guest machines running on host machines. The guest machines can mimic complete hardware platforms or a portion of a hardware platform such as the functionality required to run an operating system. Virtualization hides the physical characteristics of the host machine from the users, presenting instead the functions and characteristics of the guest machine. Often, a hypervisor is responsible for launching and maintaining the guest machines.

OS level virtualization, a.k.a. containerization, refers to isolated user-space instances called containers, partitions, virtual engines (VEs), or jails. Containers often look like real computers from the perspective of programs running in them. A computer program running on an ordinary person's computer's operating system can see all resources (connected devices, files and folders, network shares, CPU power, quantifiable hardware capabilities) of that computer. However, programs running inside a container can only see the container's contents and devices assigned to the container.

Application virtualization typically requires a virtualization layer replacing part of the runtime environment normally provided by the operating system. The virtualization layer intercepts I/O operations of virtualized applications and transparently redirects them to a virtualized location. For example, disk operations can be redirected to a single file. The application is unaware that it accesses a virtual resource instead of a physical one.

Desktop virtualization generally refers to hardware virtualization or containers having access to a windowing environment such that a person can interact with desktop applications running in a container or VM.

Network virtualization combines hardware and software network resources and network functionality into a virtual network. A virtual network is single, software-based administrative entity. Network virtualization can be internal, external, or both. An internal virtual network provides network-like functionality to VMs. An external virtual network combines physical networks or parts thereof into a virtual unit. A VLAN, discussed above, is an example of network virtualization.

Returning now to FIG. 6, VM 1 609, VM 2 606, VM 3 602, and VM 4 604 are running on commodity hardware 601. The VMs can be containers or can be virtualized hardware. VM 3 602 is running a HTTPS server 603. VM 4 604 is running a database 605. VM 2 606 is running network element 1 607 that provides SDN datapath 1 608. VM 1 609 is running SDN application 610 and SDN controller 611. Separately, layer 3 switch 612 is providing SDN datapath 2 613. User equipment (UE) 614 is in communication with HTTPS server 603 which is in communication with database 605. The SDN being properly configured via SDN controller 611, UE 614 cannot access database 605. For example, SDN application 610 can specify two networks with one network privately connecting HTTPS server 603 to database 605 while the second network connects HTTPS server 603 to the outside world such that it can be contacted by user equipment 614.

By some definitions, HTTPS server 603, database 605, and SDN application 610 are examples of network functions. By all definitions, network element 1, layer 3 switch 612, SDN controller 611 are network functions. Network function virtualization is the placement of network functions in VMs. Network element 1 607 running in VM 2 606 is an example of a virtualized network function. SDN controller 611 running in VM 1 609 is another example of a virtualized network function.

FIG. 7, labeled as Prior Art, illustrates a 3GPP Evolved Packet Core network (3GPP EPC) 715 as publicized by the 3GPP. Those familiar with mobile telecommunications networks and standards are familiar with the 3GPP EPC 715. User equipment 1 (UE 1) 701 is an LTE device wirelessly communicating with eNodeB 703. An Evolved Node B (eNodeB), an element of an LTE RAN, is network hardware that communicates directly with mobile handsets. Referring back to the BBU (controller) and RRU (air interface) of FIG. 2, eNodeB hardware can incorporate both the controller and the air interface or it can have separate controller and air interface.

WiFi AP 704 is a wireless local area network (LAN) access point communicating wirelessly with User Equipment 2 (UE 2) 702. WiFi devices are based on the IEEE 802.11 series standards. WiFi AP 704 is non-3GPP equipment because the Institute of Electrical and Electronics Engineers (IEEE) is not the 3GPP. WiFi AP 704 is untrusted non-3GPP equipment because the operator of the network illustrated in FIG. 7 has elected not to trust WiFi AP. ePDG 709 connects WiFi AP 704 to the trusted part of the illustrated network.

The 3GPP Authentication, Access, and Accounting (3GPP AAA) node 708 interacts with the ePDG to control communications between user equipment such as UE 2 702 and Packet Data Network Gateway 2 (PD-GW 2) 710. Authentication refers to confirming the identity of user equipment, such as UE 2 702, or of a person using user equipment. Authorization refers to determining what the user equipment is allowed to do. Accounting refers to tracking and perhaps billing for what the user equipment has done. As such the data connections from 3GPP AAA 708 to ePDG 709 and to PD-GW 2 710 are control connections because the data is control data, not user data. Packet data network gateways such as PD-GW 1 711 and PD-GW 2 710 provide a data connections from the 3GPP EPC 715 to other data networks such as the internet at large or to another provider's network.

The 3GPP Home Subscriber Server (3GPP HSS) 707 is a database containing user related and subscriber related information. 3GPP HSS 707 can also provide support functions related to call/session setup, mobility management, and user authentication and access authorization. The data connection between 3GPP HSS 707 and 3GPP AAA 708 can be considered a control connection with the 3GPP AAA 708 accessing data stored in the 3GPP HSS 707 database. Those knowledgeable of modern telecommunications networks are familiar with 3GPP HSSs and 3GPP AAAs.

The 3GPP Mobile Management Entity (3GPP MME) 706 is a LTE access network's main control node. A 3GPP MME selects the serving gateway for user equipment and changing the selections to a different serving gateway as user equipment roams by moves from eNodeB to eNodeB. A 3GPP MME can enforce roaming restrictions. 3GPP MME 706 can interact with 3GPP HSS 707 to authenticate users/user equipment, determine what QoS is to be provided, determine access levels, and determine access restrictions. A 3GPP MME can page and tag idle user equipment, including retransmitting when needed. Those familiar with modern telecommunications networks are familiar with the function and capabilities of 3GPP MMEs.

The Serving Gateway (SGW) 705 routes and forwards user data packets between eNodeB 703 and the Packet Data Network Gateways (PDN GWs) 710, 711. Using SDN terminology, a SGW provides a datapath for the LTE network while the 3GPP MME is a controller. A SGW can be a mobility anchor for the user equipment during roaming. Referring to FIG. 7, roaming between eNobeBs requires additional eNodeBs connected to SGW 703 and 3GPP MME 706. A SGW can manage and store user equipment contexts such as IP parameters and routing information. Those familiar with modern telecommunications networks are familiar with the function and capabilities of SGWs.

The Access Network Discovery and Selection Function (ANDSF) node 713 is equipment that helps user equipment discover and use non-3GPP access networks. Many current smart phones can communicate using both LTE and WiFi with the WiFi connection being unmetered. For example, UE 1 701 may be using LTE to stream high definition video from the internet 714, which can be costly. ANDSF 713 can help UE 1 701 connect to and stream that video through WiFi AP 704 instead of eNodeB 703. ANDSF 713 is illustrated as within an Administrative PDN 712. Administrative PDB 712 represents the computers used by the network operator's personnel to interact with the 3GPP EPC 715.

The Policy and Charging Rules Function entity (PCRF) 716 supports flow base charging, data flow detection, and policy enforcement. Policy enforcement generally means real-time determination of what data traffic is allowed under what conditions. Charging means determining how to account, for billing purposes, for the traffic that is carried. The 3GPP has a PCRF specification. In the 3GPP EPC 715, the PCRF 716 is illustrated as being on the control plane between the SGW 705 and PDN GW 2 710. The SGW 705 and PDN GW 2 710 also have a direct data plane connection. As such, PCRF 716 can support policy enforcement and charging related to data through or between either SGW 710 and PDN GW 710. Those familiar with standard 3GPP communications networks are familiar with the equipment and function blocks illustrated in FIG. 7.

PDN GW 2 710 contains the Policy Control Enforcement Function entity (PCEF) 717. PCEF 717 communicates with the PCRF 716. It is the PCEF that actually performs the policy enforcement and charging that is supported by the PCRF. As discussed above, policy enforcement generally means real-time determination of what data traffic is allowed under what conditions while charging means determining how to account, for billing purposes, for the traffic that is carried.

Various signals interfaces specified by the 3GPP are indicated in FIG. 7. ENodeB 703 and SGW 705 communicate via S1-U, the data plane of the S1 interface. SGW 705 and 3GPP MME 706 communicate via a S11 interface. 3Gpp MME 706 and 3GPP HSS 707 communicate via a S6a interface. PCRF 716 and PDN GW 2 710 communicate via a Gx interface. SGW 705 and PDN GW 2 710 communicate via a S5 or S8 interface. PDN GW 2 710 communicates out of the 3GPP EPC via a SGi interface. UE 1 701 and eNodeB 703 communicate via a Uu interface. Those familiar with standard 3GPP communications networks are familiar with these and other 3GPP standard signal interfaces.

FIG. 8, labeled as Prior Art, illustrates an Evolved Universal Terrestrial Access Network (E-UTRAN) 801. E-UTRAN is specified by the 3GPP and has eNodeBs 703 linked together with X2 interfaces 802. The E-UTRAN 801 is connected to the 3GPP EPC 715 with an S1 interface 803 which is a backhaul specified by the 3GPP. The S1 interface control plane, S1-C, can communicate with an MME such as 3GPP MME 706. The S1 interface data plane, S1-U, can communicate with a serving gateway such as SGW 705. Each eNodeB 703 in an E-UTRAN has both an air interface and a controller. The X2 interface 802 interconnects a user data plane and a control plane to the eNodeBs 703.

FIG. 9, labelled as Prior Art, illustrates certain IP multimedia Subsystem (IMS) entities. The IMS entities are the CSCF 908, MRF 909, IBCF 920, and TrGW 921. These blocks are illustrated here to simplify the illustrations of other figures and to introduce IMS entities shown in other figures, most notably FIG. 10. The 3GPP has published standards for the IMS, IMS entities, and the communications interfaces between IMS entities. Internally, the IMS is a packet based network using IP. IP, a layer 3 protocol, does not have a concept of a circuit, connection, or communications session because it merely routes packets to their destinations. Higher layer protocols, such as TCP, can handle connection between end points. A core communications protocol within an IMS is Session Initiation Protocol (SIP) which is used for signaling and controlling multimedia communications sessions such as voice or video calls. Within an IMS, the Call Session and Control Function (CSCF) 908 facilitates SIP session setup and teardown and includes three elements. The CSCF includes a Proxy Call Session Control Function (P-CSCF) 915, an Interrogating Call Session Control Function (I-CSCF) 916, and a Serving Call Session Control Function (S-CSCF) 917.

Primarily, the P-CSCF 915 is an entry point to the IMS for the UE. Referring to FIG. 7, PDN-GW 2 710 can communicate SIP messages to a P-CSCF in an IMS using an SGi interface. The Interrogating Call Session Control Function (I-CSCF) 916 performs functions including acting as an inbound SIP proxy server in the IMS, allocating an S-CSCF to the UE upon registration, and acting as a SIP proxy server. After UE registration, the I-CSCF acts as a SIP proxy by interrogating a Home Subscriber Server (HSS), such as 3GPP HSS 707, to determine which S-CSCF a UE is registered to and forwarding SIP messages to that S-CSCF. The Serving Call Session Control Function (S-CSCF) 917 performs session control services for a UE. The S-CSCF 917 performs functions including: being the UE's SIP registrar at the time of registration; forwarding SIP requests to other domains as needed; and validating the UE subscription for the service it is trying to use. In many installations, the P-CSCF 915, I-CSCF 916, and S-CSCF 917 are nodes with a CSCF 908 such that the CSCF 908 can be considered to be a SIP server.

The Interconnection Border Control Function (IBCF) 920 and Transition Gateway (TrGW) 921 are shown in FIG. 9. The 3GPP has published specifications for the IBCF and TrGW. The IBCF 920 is responsible for coordinating communications with a peer IMS. The IBCF 920 can communicate with the IBCF of the peer IMS using the Ici interface. The IBCF 920 can communicate with CSCF 908 or BGCF 912 via a Mx interface. The IBCF 920 can communicate with and control one or more TrGWs using an Ix interface. TrGW 921 forwards media streams to a TrGW within the peer IMS using a Izi interface.

The Multimedia Resource Function (MRF) 909 performs media related functions such as media playing processing independent of application type, playing tones, transcoding, and other functions. The MRF 909 includes two other IMS entities, the Multimedia Resource Function Controller (MRFC) 918 and Multimedia Resource Function Processor (MRFP) 919. The MRFP 919 performs the media related processing functions and is controlled by the MRFC 918.

The Media Resource Broker (MRB) 922 supports the sharing of a pool of heterogeneous MRF resources by multiple heterogeneous applications. The MRB can assign and releases specific MRF resources as requested by applications. The MRB 922 can communicate with an Application Server (AS) 914 using an Rc interface. The MRB 922 can communicate with the S-CSCF 917 using an ISC interface.

FIG. 10, labeled as Prior Art, illustrates major elements and entities within an IMS 901. Many entities and elements have been discussed above and are here shown within an IMS. Other entities and elements are introduced in FIG. 10. The Breakout Gateway Control Function (BGCF) 912 decides how to route telephony sessions having source or destination inside a circuit switched network network. PSTN, 2G, and 3G are considered to be circuit switched networks. The BGCF can route a session to a BGCF in a different IMS or can work with MGCF 911 and MGW 904 within IMS 901 to route the session to a circuit switched network such as PSTN 905 or 2G/3G network 906. The Media Gateway (MGW) 904 is primarily responsible for transcoding a session from the format used by the UE or IMS into that used by the circuit switched network 905, 906. The MGW 904 can be connected directly to a PDN GW such as PDN GW 2 710 using an SGi interface such that session data, such as a voice call, passes directly from 3GPP EPC 715 to MGW 904. The MGW 904 can communicate with the circuit switched network using the data plane of a CS interface. The control plane of the CS interface can connect MGCF 911 to the signaling plane of a circuit switched network such as SS7 907. Some IMS descriptions place a signaling gateway between MGCF 911 and SS7 907.

IMS-Access Gateway (IMS-AGW) 902 regulates and controls the passage of IP packets into and out of the IMS. It can be the entity that is connected to by PDN-GW 2 710 or other entities outside of the IMS. The Application Server (AS) 914 provides services to the UE including audio/video conferencing, multiparty gaming, presence, and content sharing. The Subscriber Location Function (SLF) 913 is a standardized 3GPP entity that is needed when there are multiple HSS such as HSS 707 available. SLF 913 determines which HSS is associated with a particular user profile.

LTE is discussed above, most notably in reference to FIGS. 7 and 8. Further advances in LTE technology relate to LTE in unlicensed spectrum. Three versions of LTE for unlicensed spectrum have been substantially developed. All three versions can interact with 3GPP compliant network elements and entities. LTE-Unlicensed (LTE-U) has been developed by the LTE-U Forum and, in its current form, is intended to share space with WiFi. Share space means that the air interface operates over the same or similar frequencies and has the capability of causing interference. License Assisted Access (LAA) has been standardized by the 3GPP although a certain equipment manufacturer calls a similar technology by the same name. In either case, LAA refers to LTE access technology that can use unlicensed spectrum, such as that used by WiFi, as well as licensed spectrum. LAA avoids interfering with other devices within the unlicensed space by using a listen-before-talk (LBT) protocol. Multefire is a standalone variant of LTE currently intended for small cells. Multefire only uses unlicensed spectrum.

Unlicensed spectrum refers to frequency bands that are not licensed to specific entities but that are available to be shared by whatever entities chose to deploy equipment using those frequency bands. WiFi uses frequencies in the 2.4 GHz and 5.8 GHz unlicensed bands. Other equipment in those bands includes cordless phones, security cameras, remote controls, and video transmitters. Those familiar with radio technologies, particularly the government mandated frequency allocations, are familiar with the various unlicensed frequency bands in various jurisdictions. Recently, spectrum in the 3.5 GHz band (3550 MHz to 3700 MHz) has been authorized for shared wireless access in the US. This band is also referred to as "CBRS" because it has been previously assigned to Citizens Band Radio Service. The details of system operation in US using the CBRS band are specified in Part 96 of the FCC rules. Multefire is a good match for the CBRS band because Multefire is intended for small cells and CBRS is allocated in small cell allotments.

Two of the recent advances in LTE that relate to the CBRS and Multefire are LTE-Frequency Division Duplex (LTE-FDD) and LTE-Time Division Duplex (LTE-TDD). LTE-FDD uses paired frequencies for upload and download while LTE-TDD alternates between upload and download on a single frequency.

Those familiar with modern telecommunications networks are also familiar with the standards and publications of the 3GPP. The figures discussed in this background section and labeled as "Prior Art" draw significantly from 3GPP publications and use 3GPP nomenclature when discussing 3GPP structures and interfaces. Those familiar with modern telecommunications networks will recognize the 3GPP structures and interfaces discussed herein and will know to consult the relevant 3GPP publications for a full understanding of those 3GPP structures and interfaces. The relevant 3GPP publications are hundreds of pages long and the material therein is not reproduced herein. The prior art figures and related discussion are therefore not full and complete specifications but are intended to guide the practitioner to those parts of current telecommunications networks that are most relevant for understanding the aspects of the embodiments claimed below. Those having a knowledge of LTE architectures will immediately recognize that the subsystems and entities taught herein refer to specific structures within core networks and will understand the operation and use of those structures.

Those practiced in the art of telecommunications networks know that functioning communications networks can have multiples of the network elements and entities disclosed in this background section.

Those practiced in the art of telecommunications networks know that a functioning communications network cannot be assembled from the parts described herein by simply combining structures, elements, functions or entities. The prior art network structures, elements and entities communicate with one another using well defined interfaces conforming with interface specifications and the interface specifications detail the protocols accepted by those interfaces. The standardization has been beneficial to network architects because standards-compliant elements and entities can be interconnected in certain specified ways and their interfaces trusted to work. The well-defined interfaces also restrict what structure, element or entity can interact with what other structure, element or entity. As such, network structures, elements and entities will not function unless they are connected to other network structures, elements or entities in certain narrowly defined configurations. Other configurations are unlikely to work.

As can be inferred by this background section, prior art telecommunications networks are well developed and well understood. The prior art telecommunications networks are also complex, expensive, and difficult to maintain and administer. It is therefore difficult for a business to field a telecommunications network and nearly impossible unless that business is a specialized telecommunications provider. Systems and methods that provide non specialist businesses with limited resources to deploy telecommunications networks are needed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

A core owner who has deployed a unified core network can provide LTE networking capabilities to numerous private owners. A private owner is a person, corporation, or other legal entity having Remote Radio Units (RRUs) but no core network such as that illustrated in FIG. 3. The private owners desire to deploy their RRUs to thereby provide LTE networking capabilities to user equipment (UE) that can communicate with the RRUs. A core operator can provide the private owners with access to a slice of unified core network. A slice of the unified core network can provide the LTE networking capabilities to the private owners. Slicing the network is a mechanism for partitioning the unified core network so that the different private owners cannot access each other's data and so that each private owner, in essence, has a virtual core network that the private owner can manage for the benefit of its users and itself. The embodiments disclosed herein are a significant advance over the prior art because they provide private operators the ability to enjoy the benefits of having their own core network without the burden of provisioning and maintaining a core network.

It is therefore an aspect of the embodiments that a unified core network comprises a Converged Packet Gateway (CPG), a user database (UD), a Home Subscriber Server (HSS), a Mobility Management Entity (MME), a Policy and Charging Rules Function entity (PCRF), and a Policy Control Enforcement Function entity (PCEF). The HSS, MME, PCRF, and PCEF are virtualized or containerized. For ease of reading, this disclosure shall refer to something that is "virtualized or containerized" as "virtualized." The CPG combines the functionality of a Serving Gateway (SGW) and a Packet Data Network GateWay (PDN-GW). The CPG can be a Software Defined Network (SDN) element and can be fully virtualized or partially virtualized. As a SDN element, the CPG would have a control plane and a data plane. The unified core can use a SDN controller as the CPG control plane and the SDN controller can be virtualized. The CPG data plane can also be virtualized as an aspect of Network Function Virtualization (NFV).

The unified core network's UD can also be virtualized, but might not be. Many cloud service providers offer databases that can be accessed through Application Program Interfaces (APIs) or other interfaces. Core operators taking advantage of such database services do not need to concern themselves with the implementation details of the database. It is because cloud based database services have become highly reliable, scalable, and distributed that the unified core network is not here described as necessarily containing a database server or virtualized database. The unified core network can use an explicitly created and configured database server or virtualized database server. Alternatively, the unified core network can access a cloud based database such as those offered by Amazon Web Services or Google Cloud Services. The UD stores user related information.

It is important to note that the unified core network described thus far in this section can be rapidly assembled as a collection of virtual entities and an optionally virtual user database. Utilities such as Kubernetes, which is relied upon by many cloud service providers, can be configured to launch virtual machines or containers instantiating the virtualized unified core network elements. When launched, the virtualized elements can be automatically loaded with configuration data. Furthermore, utilities such as Kubernetes provide for launching multiple instances of unified core entities such as multiple CPGs or MMEs. These various instances can be launched on commodity hardware and placed close to other elements. For example, commodity hardware running the BBUs of a V-RAN can also host an MME and CPG.

Regarding specific unified core network entities, the HSS and PCRF access user data stored in the UD. The MME communicates with the HSS for user authentication and communicates with the CPG to authorize UE and to help manage communications between UE and the unified core network. The PCRF stores rules and communicates with the PCEF which enforces the rules.

It is noteworthy that if the CPG were connected to a E-UTRAN and to the internet then the unified core network described thus far in this section would be fully capable of providing LTE services similar to those provided by the 3GPP EPC 715 of FIG. 7. At this point, an IP Multimedia Subsystem (IMS) has not been added to the unified core network. Adding the IMS is discussed later in this disclosure.

Private owners can deploy air interfaces such as RRUs and connect them to the unified core network by way of a BBU and backhaul. The backhaul can be an optical link or an optical fiber network. The private owners have the option of also deploying their own BBUs along with their RRUs. Alternatively, the RRUs can be connected to BBUs provided with the unified core network. For example, an RRU can be connected into a V-RAN using a communications network such as optical fiber within a SDN. Upon detecting the RRU, the unified core network or the V-RAN can automatically launch a BBU, and automatically configure the SDN to connect the RRU to the BBU and the BBU to the CPG and MME using optical links. In this manner, private owners can connect RRUs to the unified core network and the RRUs will interact with the unified core network to provide LTE services to UEs.

The unified core network can download configuration data into a newly launched BBU within a V-RAN to thereby inform it of necessary parameters such as power level, operating frequencies, and modulation types. In many cases, an already active RRU will be close enough to interfere with the RRU connected to the new BBU. In such cases, the unified core network can download additional configuration data to the BBU connected to the previously active RRU. The additional configuration data can alter power levels or otherwise attempt to reduce the interference between the RRUs.

The RRUs interacting with the unified core network can operate in unlicensed spectrum or licensed spectrum. As such the RRUs and BBUs can be configured to use frequencies allocated for the Citizens Band Radio Service (CBRS). In such case, the configuration can for LTE-Unlicensed (LTE-U), License Assisted Access (LAA), or Multefire. As discussed above, CBRS is intended for small cells and, in the US, the Spectrum Access System (SAS) automatically authorizes (or denies) operators to use frequencies within cells. The unified core network can interact with the SAS to obtain authorizations for the RRUs to operate within their respective cells.

A private owner can deploy multiple RRUs with some RRUs indoor and other RRUs outdoors. The PCRF can contain rules governing that some UEs are to be connected to outdoor RRUs and others connected to indoor RRUs. The HSS can also contain user data indicting which RRUs particular UE preferentially connect to with the MME determining those preferences by accessing the HSS.

The unified core network can have a control plane and a data plane. For example, the connections between two CPGs or CPG to BBU (or eNodeB) are data plane connection because it passes user data to and from UEs. The connection between BBU (or eNodeB) and MME or between PCRF and PCEF are control plane connections because they pass data used within the unified core network to control unified core network entities and elements. Internally, the unified core network can be an IP based SDN. The SDN can define the control plane and the data plane to be different IP based networks in that data cannot pass from one to another without explicitly transiting a gateway. The gateway can be a NFV element.

It is important that the private owners can manage their own telecommunications networks even though they are accessing a unified core network instead of their own core network. It is also important that the private owners cannot access or interfere with the telecommunications networks of other private owners or with the core owner's configuration and management of the unified core network itself. For this reason the PCRF, PCEF, MME, and HSS can be partitioned, or sliced. The configuration data, user data, and other data within these entities can be split into partitions and access to the partitions limited. For example, a first private user can have access to only his own data partitions within the PCRF, PCEF, MME, HSS, and UD. A second private user can have access to only his own data partitions within the PCRF, PCEF, MME, HSS, and UD. The core operator would have access to his own partitions within the PCRF, PCEF, MME, HSS, and UD and possible other partitions as well, depending on his agreements with the private operators. The core operator's data can modify or overrule how the unified core network interprets or acts on the private users' data. For example, the core operator can add rules to the PCRF limiting each private user's total bandwidth through various parts of the unified core network data plane. A private owner can add rules for specific user equipment or users. For example, the private owner can provide little bandwidth and poor latency to a door alarm while assigning significant bandwidth, low latency, and high QoS to a self-driving vehicle but only when that vehicle is being operated.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
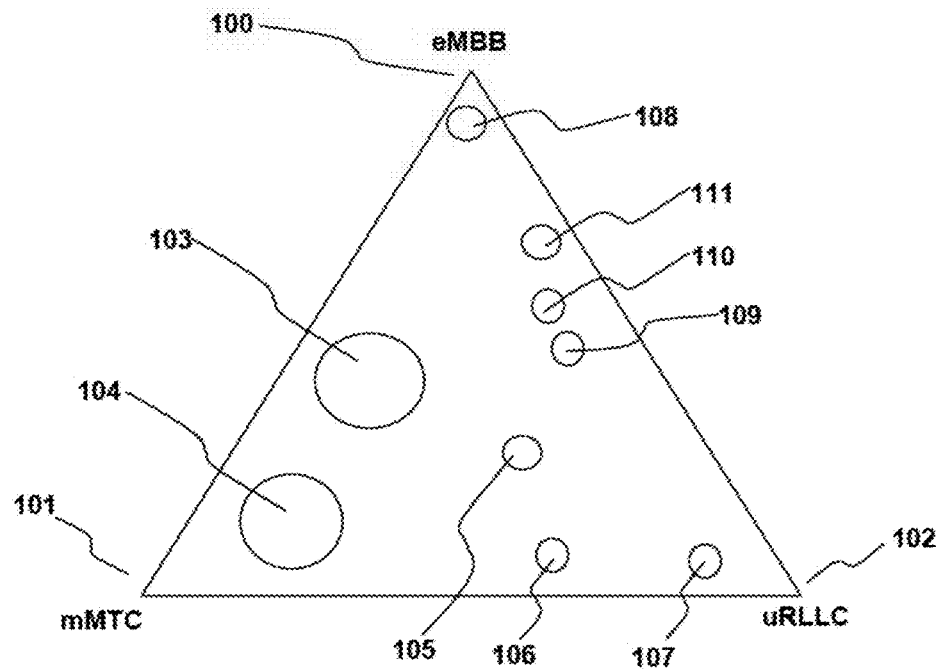
FIG. 1, labeled as Prior Art, illustrates real world use cases in the context of eMBB, uRLLC, and mMTC.
Figure 2:
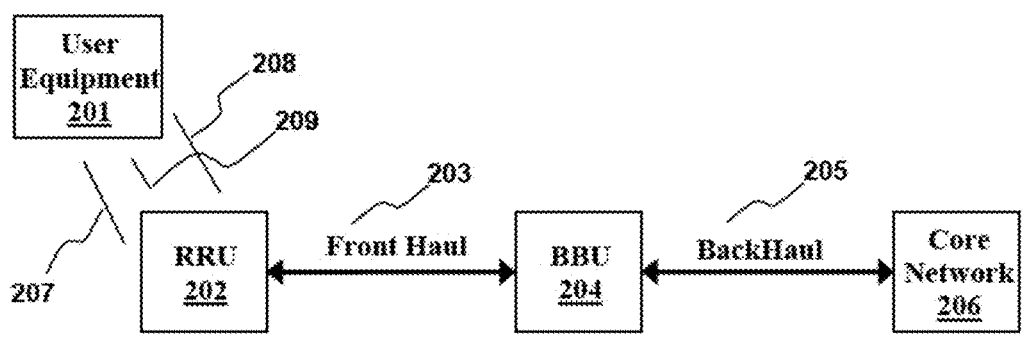
FIG. 2, labeled as Prior Art, illustrates a simple RAN.
Figure 3:
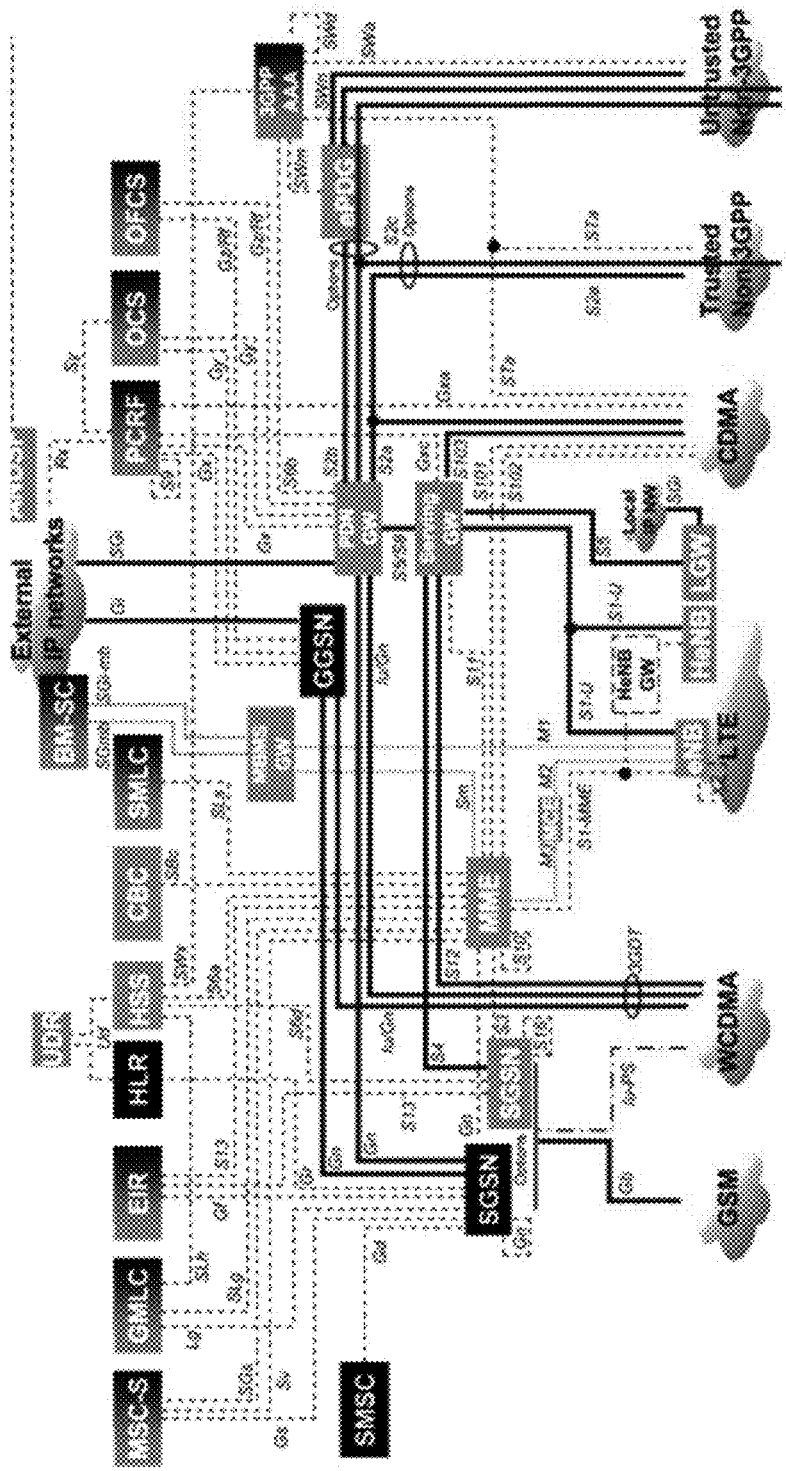
FIG. 3, labeled as Prior Art, is an illustrative example of a traditional present day telecommunications system core network.
Figure 4:
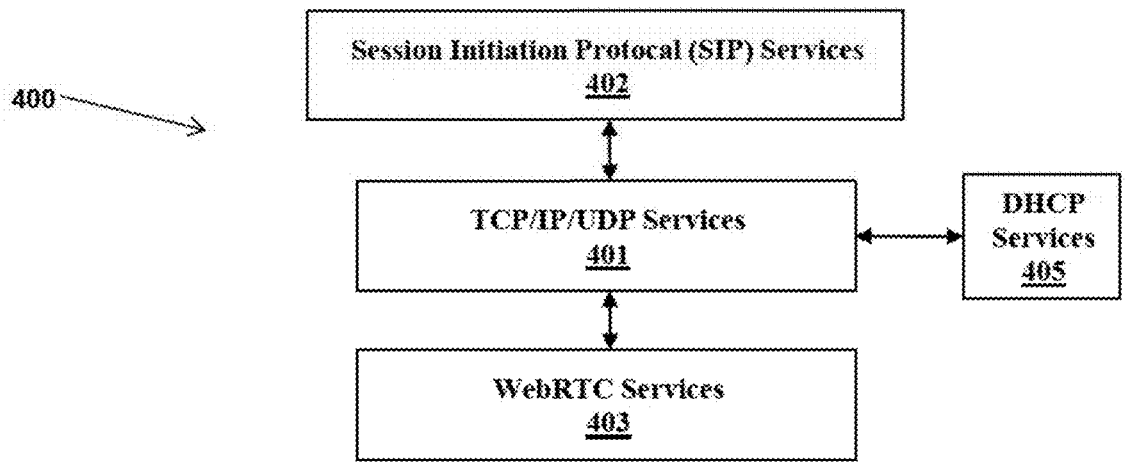
FIG. 4, labeled as Prior Art, illustrates a present day information technology network that can be used for voice, video, and data communications.
Figure 5:
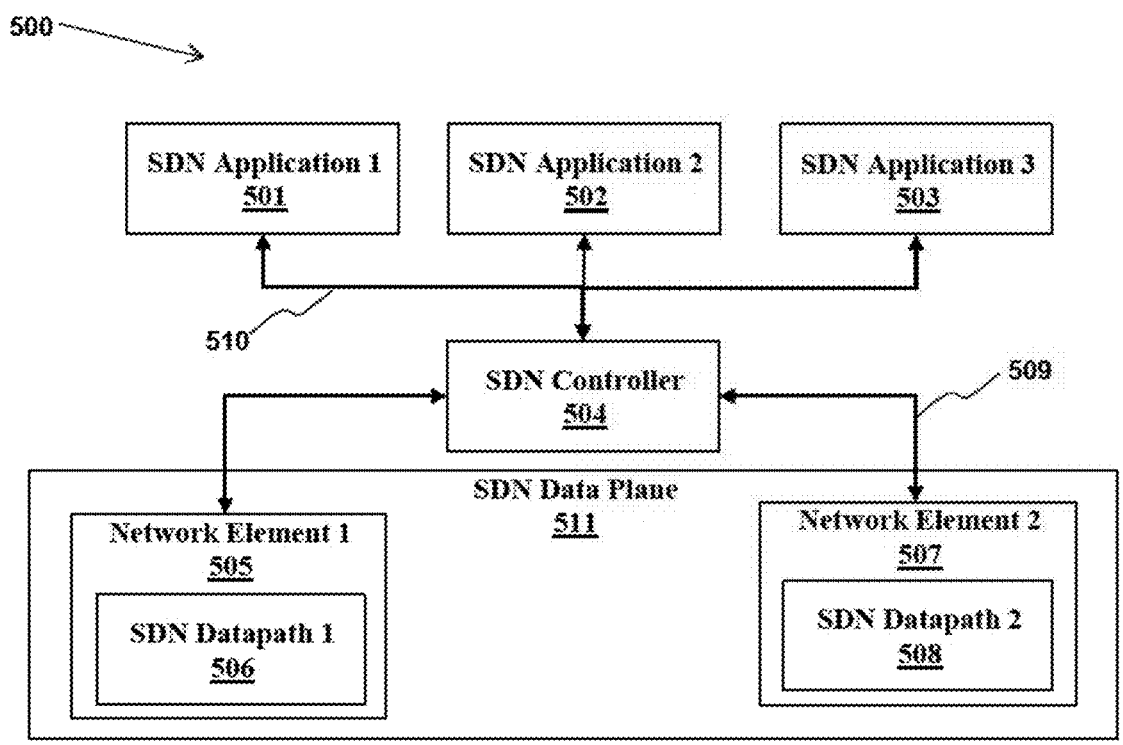
FIG. 5, labeled as Prior Art, illustrates a software defined network.
Figure 6:
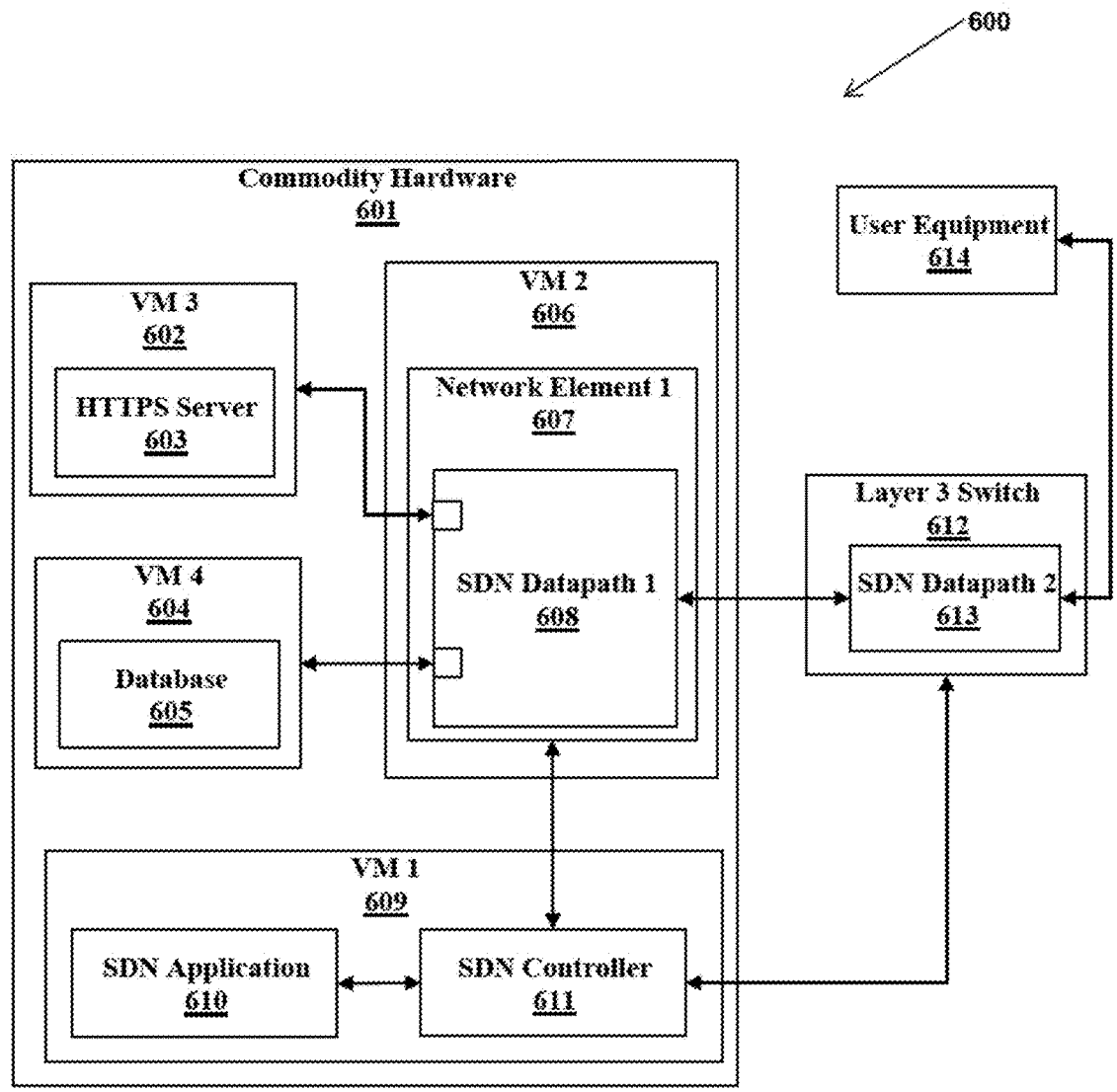
FIG. 6, labeled as Prior Art, illustrates a network enhanced with network function virtualization.
Figure 7:
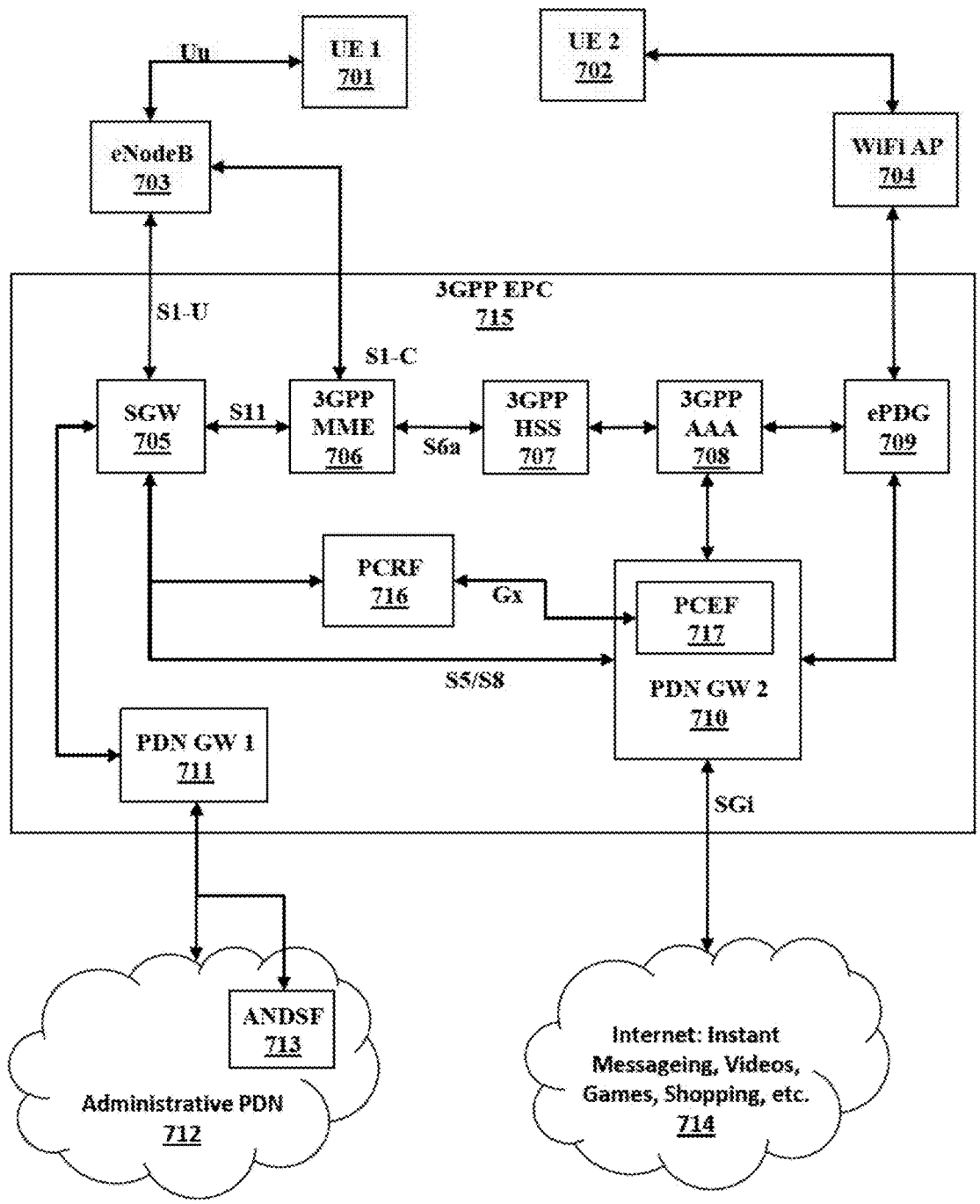
FIG. 7, labeled as Prior Art, illustrates a 3GPP Evolved Packet Core network as publicized by the 3GPP.

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements. In describing the present disclosure, the following term(s) have been used in the description.

A unified core network provides core network services to a number of telecommunications network operators. The unified core is partitioned into a number of slices with each slice being the core network for a private owner. Each private owner is then free to define services within its own partition to serve its own users and equipment. In this manner, the private owner is freed from building and maintaining a core network while simultaneously enjoying the benefit of having a core network.

Figure 10:
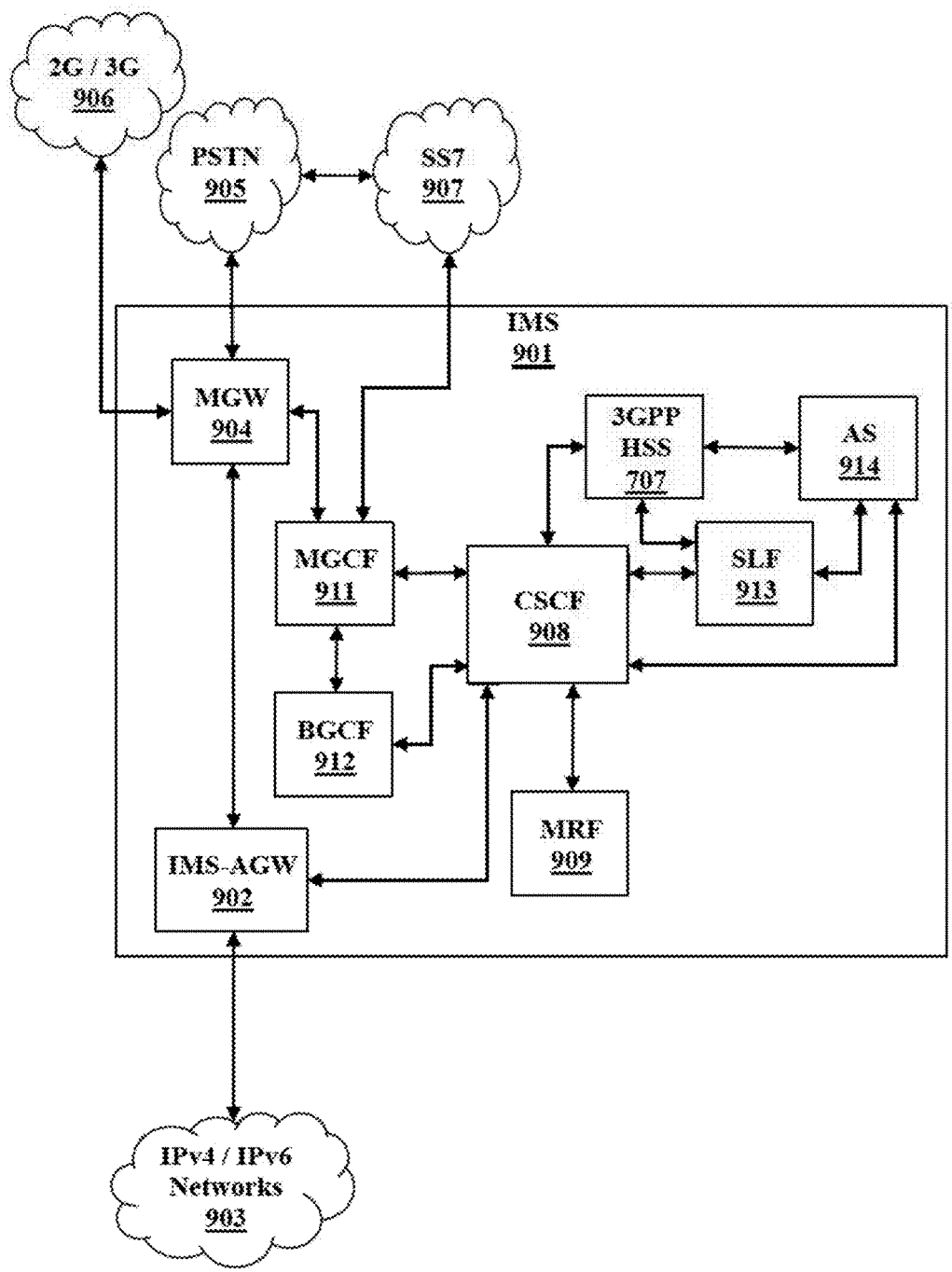
FIG. 10, labeled as Prior Art, illustrates major elements and entities within an IMS 901.
Figure 11:
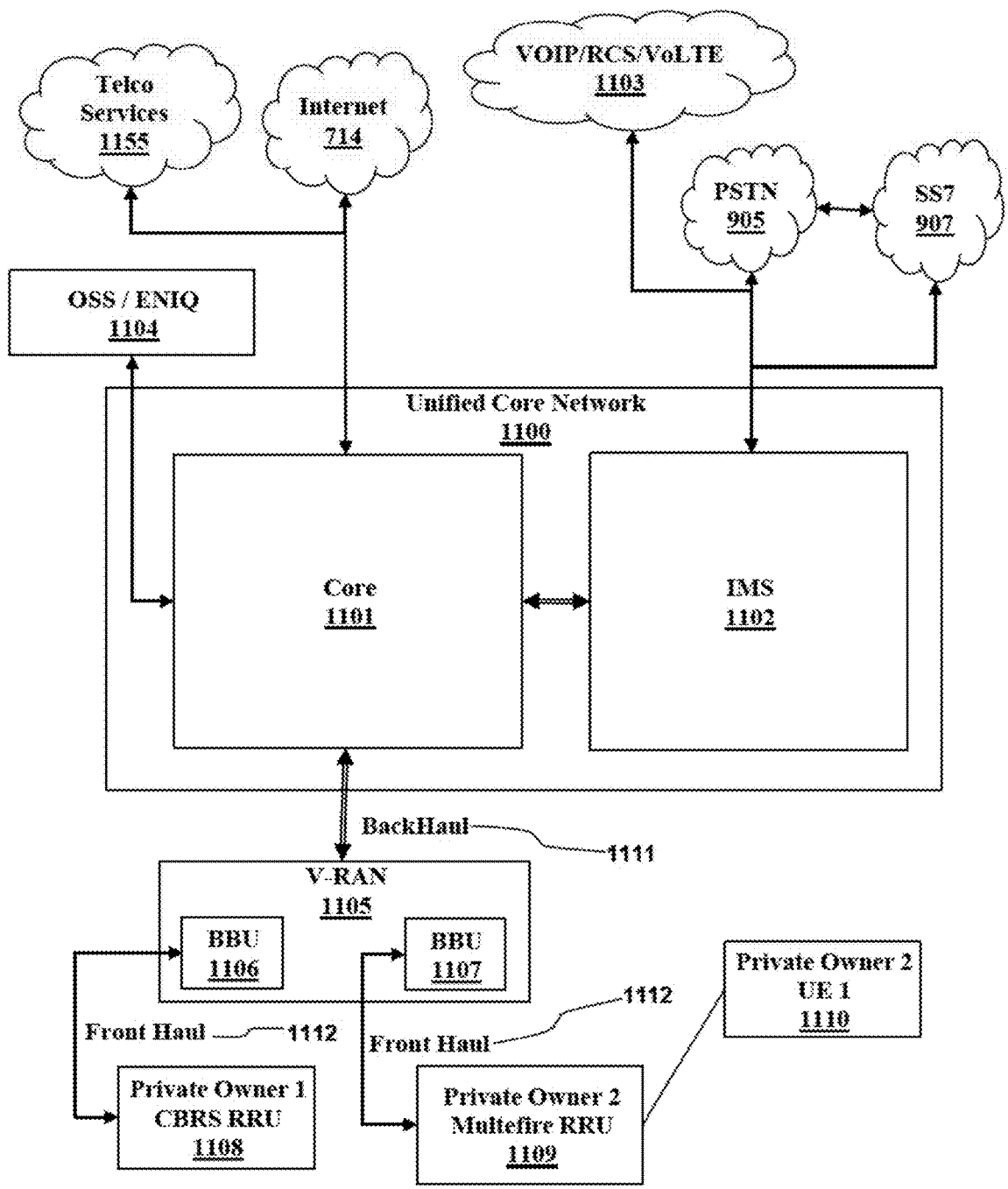
FIG. 11 illustrates a unified core network in accordance with aspects of the embodiments.

FIG. 11 illustrates a unified core network in accordance with aspects of the embodiments. The unified core network 1100 is a centralized resource interconnecting mobile phone cells, internet 714, telco services equipment 1155, VOIP/RCS/VoLTE services equipment 1103, SS7 907 and PSTN 905. SS7 907 and PSTN 905 were introduced in FIG. 10. PSTN 905, the public switched telephone network, is the legacy circuit switched telephone network providing basic ring tone to wired telephone customers. SS7 907 is the control plane for PSTN 905 network and uses the well-known Signaling System 7 protocols for setting up/tearing down PSTN circuits and for performing other functions such as number translation, prepaid billing, and SMS. Voice over IP (VOIP) is an over-the-top (OTT) technology for providing telephony over IP networks. VoLTE is similar to VOIP but uses LTE instead of IP. VoLTE is expected to outperform VOIP because IP packets are delivered on a best effort basis whereas LTE has a quality of service (QoS) component that could guarantee a better connection. RCS, Rich Communication Services, is a protocol for providing richer messaging than SMS which is largely limited to text. OTT refers generally to audio, video, and other media transmitted via the internet instead of over a cable, satellite, or broadcast service.

OSS/ENIQ 1104 refers to the systems that the network operator's personnel use for tracking operations, servicing customers, tracking network status, tracking network performance, network system maintenance, and interacting with the network core. As used herein, Operations Support Systems (OSS) is intended to include the business support systems (BSS). ENIQ is one type of merged OSS/BSS.

The core 1101 and IMS 1102 will be discussed in greater detail below. The core is designed to support packet networks in general. IMS 1102 is similar to IMS 901, has many of the same internal IMS entities, and can provide connections into circuit switched networks such as 2G/3G 906, PSTN 905, and SS7 907. IMS 1102 differs from IMS 901 in that it is adapted to interface with core 1101 and to operate within a unified core network having virtualized entities and partitioned entities.

V-RAN 1105 is a virtualized radio access network that is illustrated as running two BBUs 1106, 1107 on commodity hardware. V-RAN 1105 is connected to Core 1101 by backhaul 1111. Backhaul 1111 can be an optical link, a wired link, or a wireless link. For example, access into the unified core network 1100 can be provided using an optical fiber network that connects V-RANs and individual BBUs to core 1101. Additional V-RANs and BBUs can be connected to core 1101 by connecting them to the optical fiber network and configuring it to properly route the relevant data.

Private Owner 1 has deployed a CBRS RRU 1108 and private owner 2 has deployed a Multefire RRU 1109. The RRUs 1108 and 1109 are connected to BBUs 1106, 1107 by front hauls 1112. As with backhaul 1111, the front hauls 1112 can be optical, wired, or wireless. Returning to the optical network example, the optical network can be extensive enough to have access nodes at core 1101, V-RAN 1105, and both RRUs 1108, 1109. The RRUs 1108, 1109 can be connected to V-RAN 1105 by connecting them to the optical fiber network and by properly configuring the optical fiber network.

Figure 12:
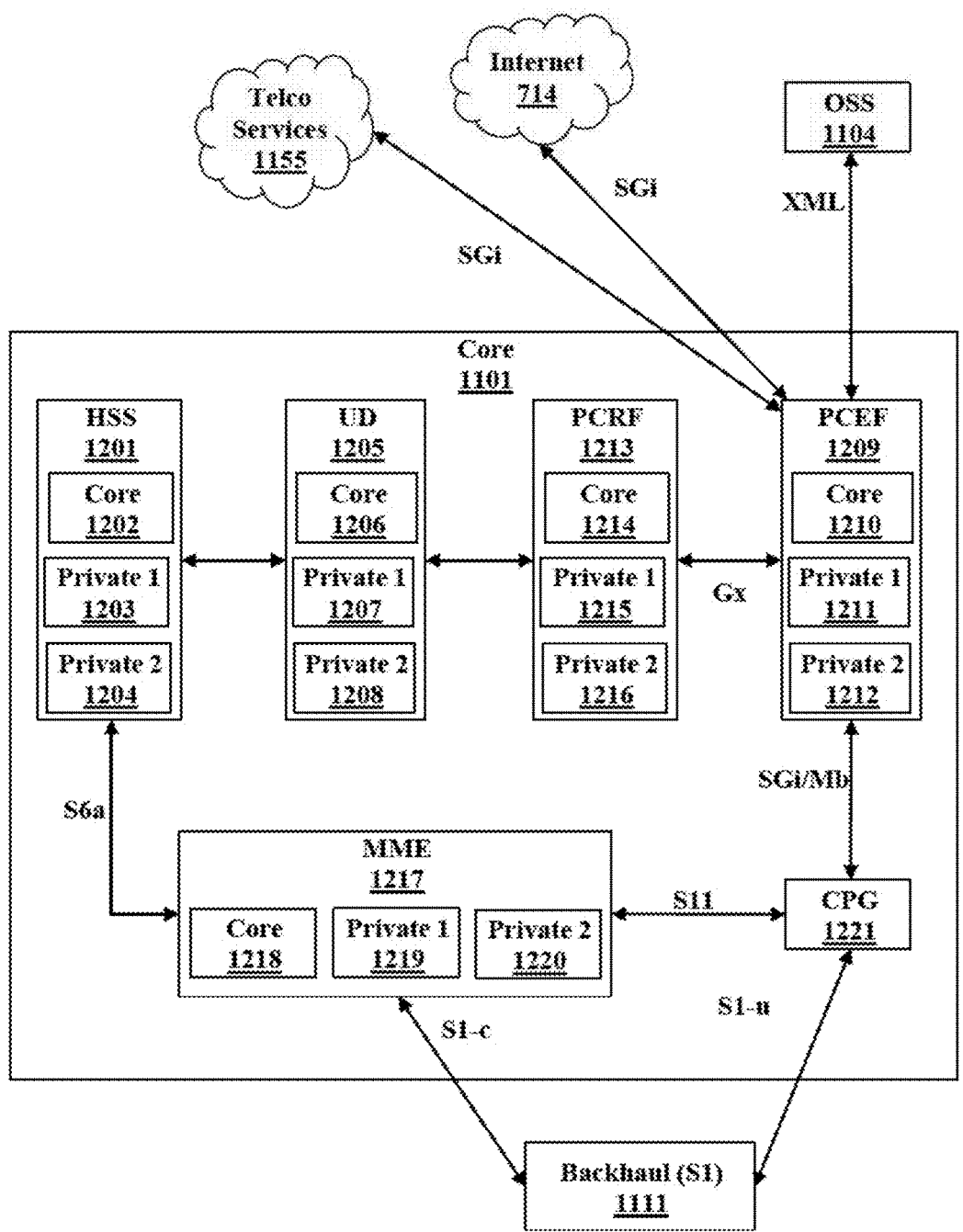
FIG. 12 illustrates the core element shown in FIG. 11 in accordance with aspects of the embodiments.

FIG. 12 illustrates the core 1101 shown in FIG. 11 in accordance with aspects of the embodiments. HSS 1201, UD 1205, PCRF 1213, PCEF 1209, and MME 1217 are partitioned with each having a core partition, a private 1 partition, and a private 2 partition. HSS 1201 has core partition 1202, private partition 1 1203, and private 2 partition 1204. UD 1205 has core partition 1206, private partition 1 1207, and private 2 partition 1208. PCRF 1213 has core partition 1214, private partition 1 1215, and private 2 partition 1216. PCEF 1209 has core partition 1210, private partition 1 1211, and private 2 partition 1212. MME 1217 has core partition 1218, private partition 1 1219, and private 2 partition 1220. The core operator, who is responsible for configuring, managing, and maintaining the unified core network 1100 has access and control of the core partitions 1202, 1206, 1210, 1214, 1218. The core owner has configured the unified core 1100 to provide access to private owner 1 and private owner 2 such that they can deploy RRUs, BBUs, and eNodeBs, connect their equipment to backhaul 1111, and thereafter have their own private LTE core networks. In configuring the unified core for use by private owner 1, the core operator sets up the private 1 partitions 1203, 1207, 1211, 1215, 1219 for access by private owner 1. In configuring the unified core for use by private owner 2, the core operator sets up the private 2 partitions 1204, 1208, 1212, 1216, 1220 for access by private owner 2.

Having access to their respective partitions, the private owners configure their slices of the unified core network for their own uses. OSS 1104 is illustrated communicating with PCEF 1209. It is expected that the core operator and private owners can use their own OSS to configure their own partitions or that the core operator can provide OSS capabilities, perhaps via access to a virtualized server running OSS software, to the private owners.

HSS 1201 can use an S6a interface to communicate with MME 1217. Backhaul 1111 is illustrated as carrying data for an S1 interface. The S1 interface includes S1-c control interface and a S1-u user data interface. MME 1217 can use the S1-c interface to communicate through the backhaul 1111 while CPG 1221 can use the S1-u interface to communicate through the backhaul 1111. MME 1217 can use a S11 interface to communicate with CPG 1221. PCEF 1209 can use SGi and Mb interfaces to communicate with CPG 1221. PCEF 1209 can use SGi interfaces to communicate with telco services 1155 and the internet 714. OSS 1104 can use XML to communicate with PCEF 1209. PCRF 1213 can use a Gx interface to communicate with PCEF 1209.

Figure 8:
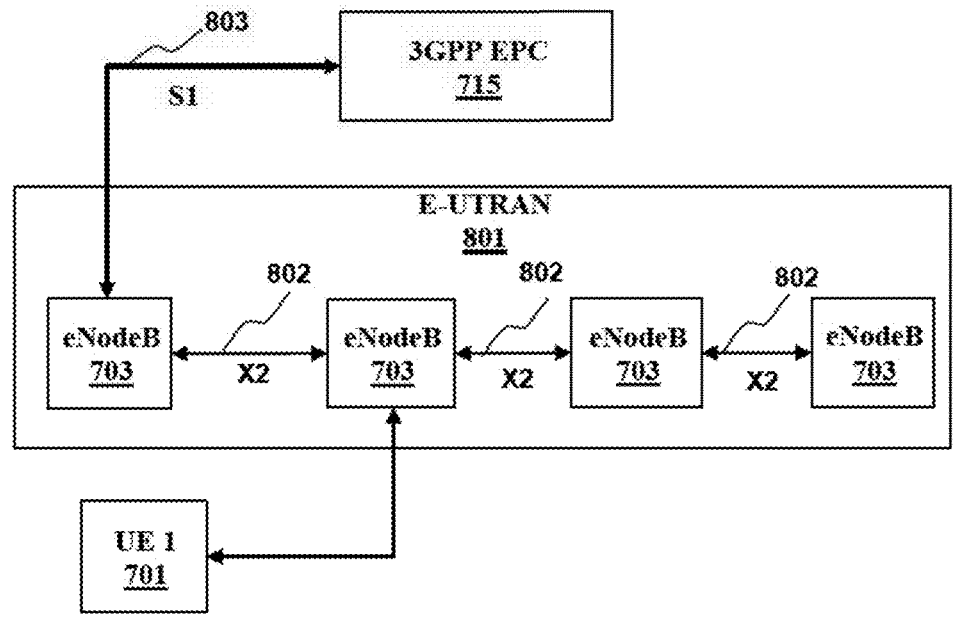
FIG. 8, labeled as Prior Art, illustrates an Evolved Universal Terrestrial Access Network.
Figure 9:
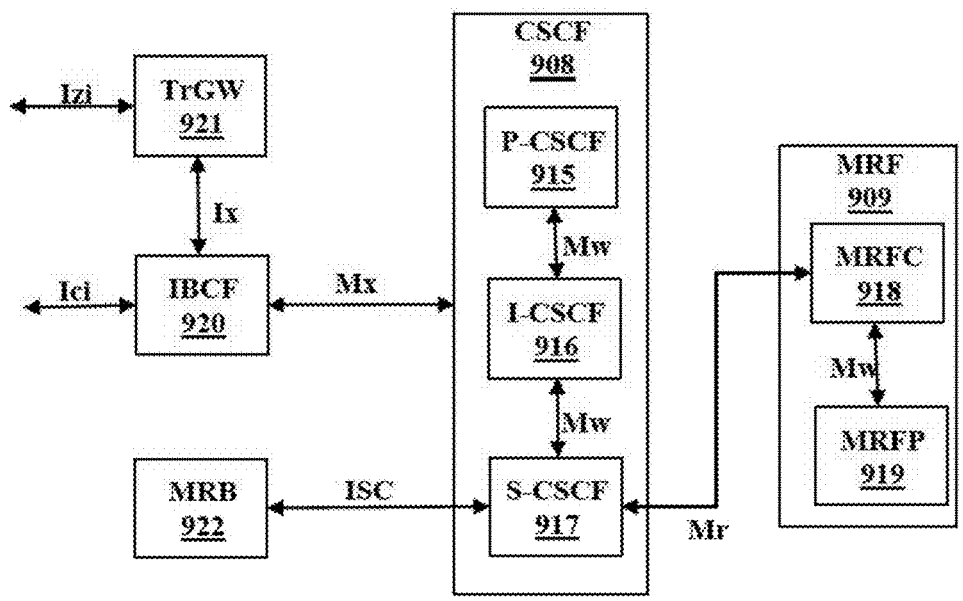
FIG. 9, labelled as Prior Art, illustrates an IP multimedia Subsystem (IMS) with certain IMS entities.
Figure 13:
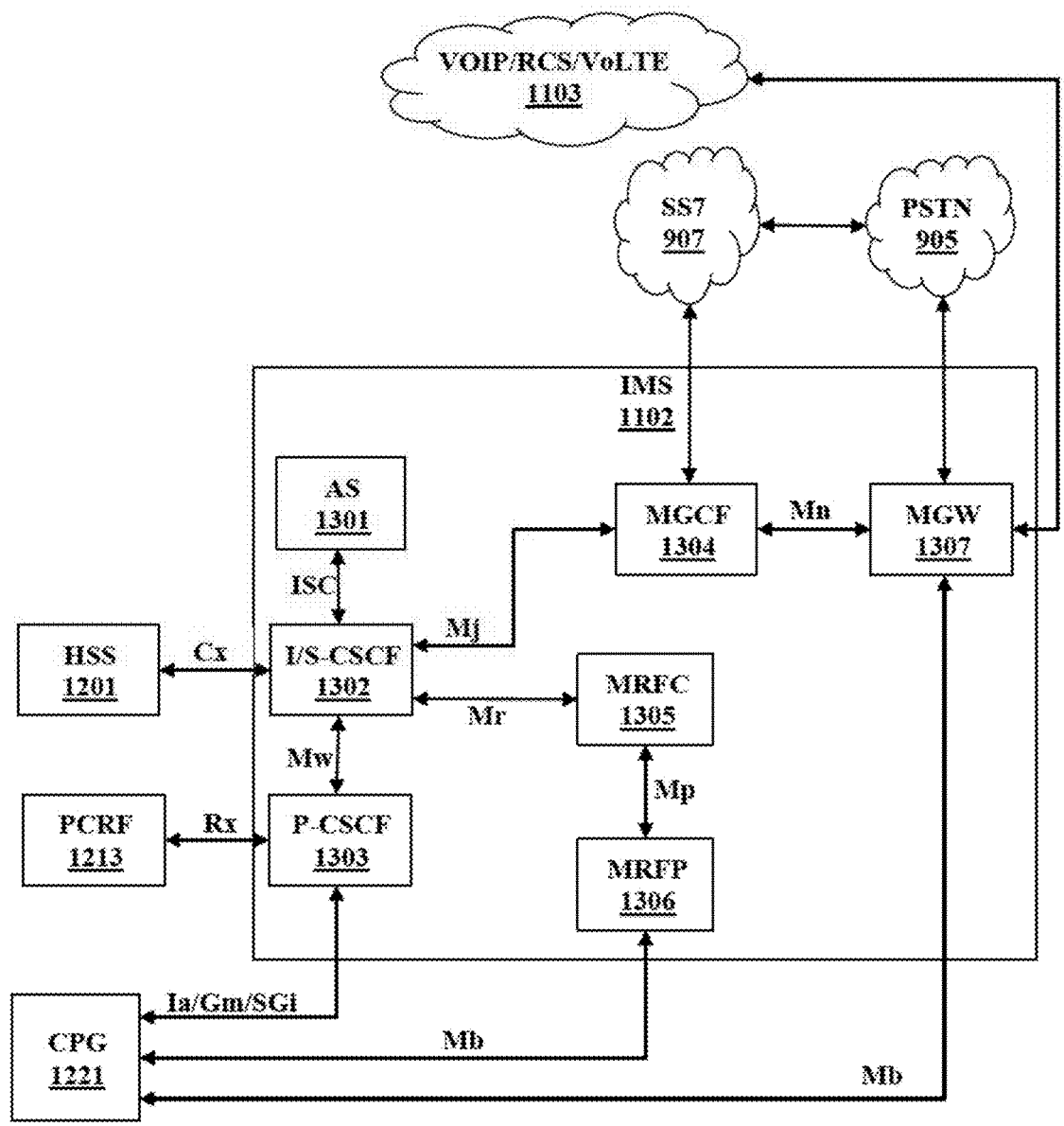
FIG. 13 illustrates the IMS element shown in FIG. 11 in accordance with aspects of the embodiments.

FIG. 13 illustrates the IMS 1102 shown in FIG. 11 in accordance with aspects of the embodiments. IMS 1102 is significantly different from the IMS 901 of FIG. 10 because IMS 1102 has entities and elements interacting with a partitioned HSS 1201 and a partitioned PCRF 1213. Furthermore, the elements and entities within IMS 1102 do not have the same interconnection topology as those of FIGS. 8 and 9.

I/S-CSCF 1302, serving as both I-CSCF and S-CSCF, can use a Cx interface to communicate with partitioned HSS 1201. P-CSCF 1303 can use a Rx interface to communicate with partitioned PCRF 1213. P-CSCF 1303 can use Ia, Gm, and SGi interfaces to communicate with CPG 1221. CPG 1221 can use Mb interface to communicate with MRFP 1306 and with MGW 1307. FIG. 12 illustrates HSS 1201, PCRF 1213 and CPG 1221 within Core 1101. As such, IMS 1102 can use Ia, Gm, SGi, Mb, Cx and Rx interfaces to communicate with Core 1101.

P-CSCF 1303 can use a Mw interface to communicate with I/S-CSCF 1302. I/S-CSCF 1302 can use an ISC interface to communicate with AS 1301. I/S-CSCF 1302 can use a Mr interface to communicate with MRFC 1305. S-CSCF 1302 can use a Mj interface to communicate with MGCF 1304. MRFP 1306 can use an Mp interface to communicate with MRFC 1305. MGCF 1304 can use an Mn interface to communicate with MGW 1307.

Figure 14:
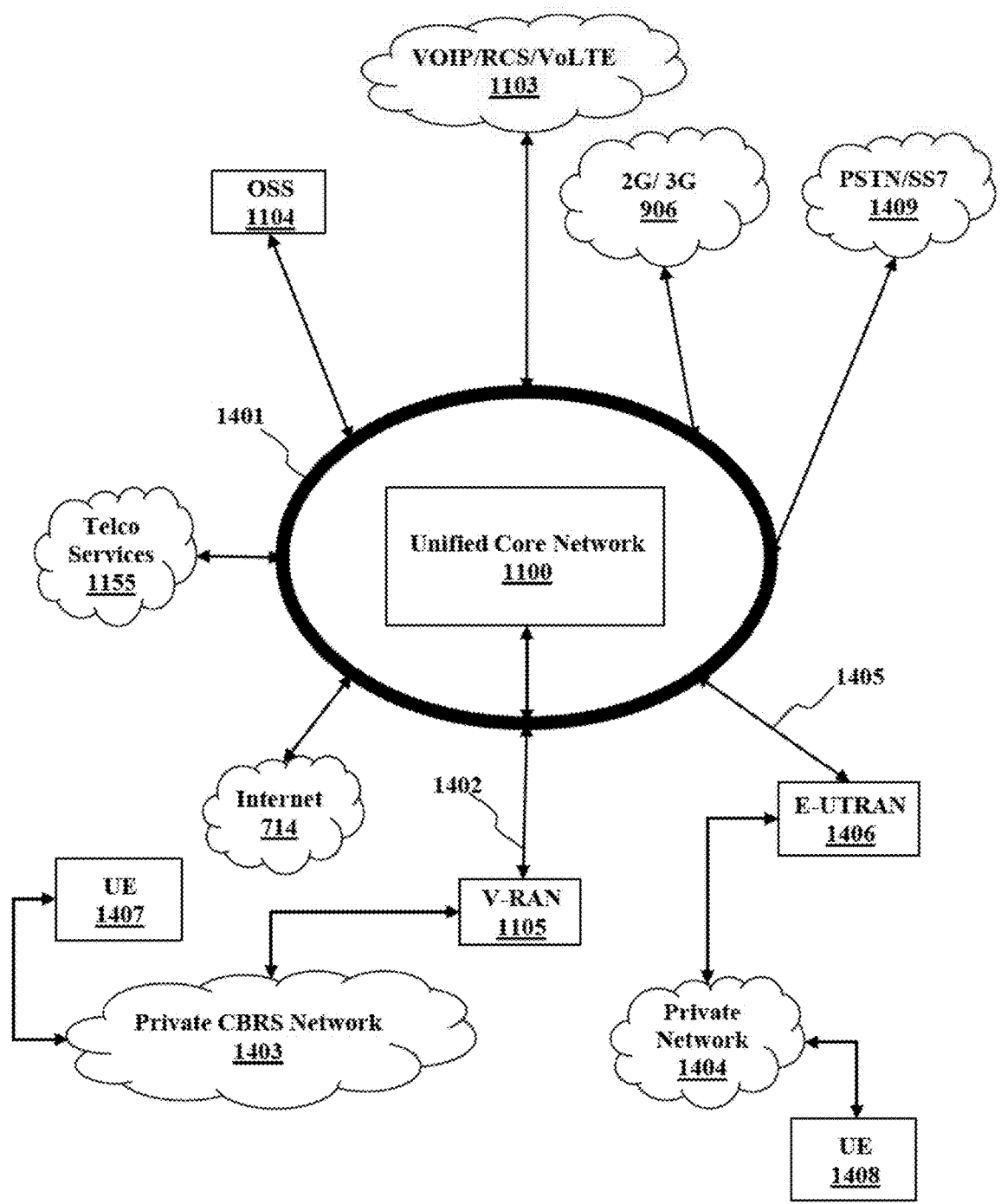
FIG. 14 illustrates a unified core network providing LTE capabilities to private networks in accordance with aspects of the embodiments.

FIG. 14 illustrates a unified core network 1100 providing LTE capabilities to private networks 1403 and 1404 in accordance with aspects of the embodiments. Unified core network 1100 is connected to optical network 1401. Private CBRS network 1403 communicates with the unified core network 1100 using V-RAN 1105 optical link 1402 and optical network 1401. V-RAN 1105 can be deployed by the core operator of unified core 1100, by the owner of private CBRS network 1403, or some other party. As illustrated, private CBRS network 1403 can consist of numerous Multefire RRUs, each serving a small cell. Private network 1404 communicates with the unified core network 1100 using E-UTRAN 1406, optical link 1405 and optical network 1401. E-UTRAN 1406 can be deployed by the core operator of unified core 1100, by the owner of private network 1404, or some other party.

Optical network 1401 can be configured to route traffic to/from V-RAN 1105 only from/to unified core network 1100. Optical network 1401 can be configured to route traffic to/from E-UTRAN 1406 only from/to unified core network 1100. The private networks 1403 and 1404 can access the internet, legacy circuit switch networks 906, 1409, and other services by way of the unified core network 1401. UE 1407 and 1408 are connected to private networks 1403 and 1404. UE 1407 and 1408 can obtain LTE services provided by the unified core network 1100.

As discussed above, the unified core network can be instantiated using SDN and NFV principals. Using SDN principals, the network can have a control plane and a data plane. Using NFV principals, the network elements can be virtualized. For example, the control plane of a network switch can be virtualized to run on commodity hardware. Similarly, the data plane can be virtualized to the extent that the data plane meets required performance specifications. Certain data plane elements, such as a RRU, cannot be virtualized because the radio receiver and transmitter must actually exist. A further example is that multiple private owners, some with Multefire, others with different CBRS applications, can connect their RRUs to a SDN/NFV unified core network providing virtualized core networks to the private owners. The virtualized network elements can include the BBUs that communicate with the RRUs. When virtualized BBUs are provided, the private owners can simply select their desired CBRS application from a library of available BBUs.

A Multefire LTE network can be instantiated by deploying CBRS capable RRUs and selecting Multefire BBUs. A V-RAN, as discussed above, can provide the BBUs. Partitions within the unified core, also discussed above, can act as a core network. As can be seen, a private owner can have a Multefire LTE network by deploying CBRS RRUs and connecting them via a V-RAN to the private owner's partition of a unified core.

Different private owners can have different use cases with one desiring eMBB, another desiring uRLLC, and a third desiring mMTC. The unified core network can be sliced such that each private owner receives the desired quality of service. In many cases, the unified core operator can enter configuration rules for the core networks Policy Control Function (PCF). The PCF can be a single structure combining PCRF and PCEF or can be an abbreviation referring to a distinct PCRF structure communicating with a PCEF structure. In either case, the unified core operator enters rules, thereby slicing or partitioning the unified core to thereby create slices or partitions for the private operators. A private operator sees its own slices/partitions as a virtual core network. The private owner can then enter PCF rules to further partition its own virtual core network. It is conceivable that a private owner can be a virtual unified core network operator by slicing its own partition for use by downstream private owners.

Now is the A private owner may have its own customer service and network management tools. An example of such a private owner is one who has been operating a core network but is transitioning to a virtual core network provided by a unified core operator. It may be easier to transition the private owner to a virtual core network if the private owner can continue using its current customer service tools and network management tools. The unified core operator can meet the private owner's need by allowing the private owner's tools to directly access the components of the core (CPG, MME, PCRF, PCEF, . . . ). Importantly, the private owner's access must be limited to that private owner's own partitions. The unified core network should therefore refuse to accept, refuse to transmit, or otherwise reject attempts by a private network operator to access other user's partitions. As discussed above, the various structures within an LTE network usually have well defined interfaces. The unified core operator can surface those interfaces to the private operators such that the private operators can use their own tools. As discussed above, the scope of the private owner's access should be limited. The private operator's tools might be incompatible with the interfaces provided by the unified core operator. In such cases an interface adapter can translate between the private owner's dialect and the unified core's dialect.

The unified core can be connected to distributed V-RAN BBUs by an optical network. As with IP networks generally, the optical network can carry a plethora of virtual networks, such as VLANs. As such, the optical network can connect the unified core network to multiple V-RANs for multiple private owners. Each private owner can be provisioned with its own VLAN or virtual network that connects the private owner's slice of the unified core to that private owner's V-RANs. The private owner can deploy its own V-RANs, can deploy commodity hardware onto which the unified core operator deploys BBUs, or can configure V-RANs, including hardware, deployed by the unified core operator.

The unified core operator can support a private owner in partitioning its own virtual private core for different use cases, traffic prioritization, and users. A virtual private core can be split into indoor and outdoor segments tailored to the different radio frequency environments typical of indoors versus outdoors. A virtual private core can be partitioned with each partition tailored for different users. For example, a human user, a door lock, a robot, and an autonomous car have significantly different needs and the virtual private core can have partitions configured for each of those users. For example, the autonomous car's partition can be configured to pass small packets with minimal latency and high reliability while the door lock, and similar IOT devices, can be configured for small packets with less critical latency and reliability. Here, the autonomous car's communications would be prioritized higher than the door lock's communications. A virtual core network can be partitioned based on use cases. Use case based partitioning can be similar to user based partitioning while requiring different administration. User based requires knowledge of the user whereas use case based requires knowledge of a use case. Use cased base administration could be simpler and less burdensome, especially when multitudes of discrete sensors are deployed, maintained, and replaced.

User equipment can have a number of different networks available and can be configured to preferentially select different networks based on network robustness, coverage, or price. For example, a public network, large carrier LTE, and private core Multefire LTE network can all be available to devices including IOT devices such as light switches, to a manufacturing robot, and to a smart phone. The private core network can be configured to provide a high quality of service to the mission critical robot but to provide mediocre service to the smart phone. As such, the smart phone preferentially connects to the large carrier LTE provider and the robot doesn't have to share bandwidth. However, the smart phone can be in an area where the large carrier LTE network has poor coverage. In such a situation, the private core Multefire network can provide better service, perhaps even adaptively increasing the power or bandwidth between RRU and smart phone. Here, the private core network cannot alter the large carriers coverage or quality of service but can adapt to it such that user equipment shifts onto and off of the private core network.

As discussed above, The BBUs can control the power, modulation, frequencies, and other behaviors of the RRUs. Meanwhile, the MME can control which RRU a particular user equipment is linked to. A virtual private core Multefire network can therefore use different network segments, such as indoor and outdoor segments, to improve capacity. Specific UE can be constrained to certain segments, such as the outdoor segment. For example, the PCEF can enforce a rule keeping an outdoor camera connected to an outdoor segment. The BBUs of that segment can be specially configured to meet capacity demands of a network of outdoor cameras by, for example, adjusting the uplinks and downlinks to the cameras.

Multefire virtual core networks can be used to great advantage in high capacity venues such as airports, stadiums, hospitals, and ports. In such venues, the venue operator can be highly motivated to provide a high quality of service meeting the demands of both the people enjoying the venue as well as equipment and personnel employed at the venue. Meanwhile, large scale carriers such as those providing nationwide or worldwide services are less concerned and less adaptable. CBRS RRUs can be deployed throughout the venue and connect them to a unified core network via V-RANS to thereby create a Multefire virtual core network. Having a high capacity network and control thereof, the venue operator can adapt to various situations, such as heightened security needs, by shifting network capacity to security devices and security personnel as needed. Such control can be implemented via the PCF.

Operations Support Systems (OSS), business support systems (BSS), and ENIQ are discussed above as systems that the network operator's personnel use for tracking operations, servicing customers, tracking network status, tracking network performance, network system maintenance, and interacting with the network core. OSS/BSS/ENIQ systems can interact with core networks using certain well defined interfaces. As discussed above, unified core networks and network slices can also use those interfaces but require certain access controls to keep private operators from interfering with one another or with overall operation of the unified core network. Control structures for self-organizing networks (SON) can also utilize the interfaces because the interfaces provide information about network status and also provide interface for network control. A SON structure within a CBRS can monitor the network and use rules to adapt to changes such as the addition or loss of RRUs. The PCRF and PCEF are well understood LTE network structures that perform rules based monitoring and control. The SON structure is a variation of the PCF that controls the network based on network status and performance. For example, the network can detect a new RRU and proceed through a series of rules to launch a BBU, connect BBU to RRU and proper slice of unified core, and then continually adjust the BBU/RRU based on capacity and the detected strength/frequencies of neighboring cells.

As discussed above, the PCRF is a structure within a LTE core network that can be partitioned in a unified core network. The unified core network can have partitions for the unified core operator and for each private operator of a virtual core network. The various operators should not be allowed to interfere with one another's PCRF partitions unless permission is granted. Those practiced in the arts of data bases, operating systems, and data access are familiar with data access protocols and data access algorithms for controlling access to specific data, classes of data, sets of data, and subsets of data. The specific PCRF implementation would guide a skilled artisan in choosing one of the available access control algorithms or mechanisms such as whitelists, blacklists, and permissions specific to fields, structures, memory blocks, tables, rows, columns, or objects. Access permissions can also be granted or withheld based on rules, individual identity, or membership in a group.

The PCEF, MME, and HSS are also structures within an LTE network that can be partitioned in a unified core network. As with the PCRF, the unified core network can have PCEF, MME, and HSS partitions for the unified core operator and for each private operator of a virtual core network. As with the specific implementations would guide a skilled artisan in choosing one of the available access control algorithms or mechanisms such as whitelists, blacklists, and permissions specific to fields, structures, memory blocks, tables, rows, columns, or objects. Access permissions can also be granted or withheld based on rules, individual identity, or membership in a group.

As discussed above, NFV can include the virtualization of the data plane, sometimes called the user plane, in commodity hardware. Implementing a NFV data plane on commodity hardware can be sped up by performing batch packet processing and using poll mode based drivers. Batch packet processing refers to the technique of processing numerous packets, perhaps all of the available packets, instead of a single packet. For example, a batch processor could process all the packets up to a limit. A 100 packet batch processor would process 99 packets if only 99 are available but would process only 100 packets even if 101, or more, are available. Poll mode based drivers are drivers, as applied to packet processing, that regularly look to see if there are packets available and then processes one or more packets. The alternative to polling drivers are interrupt driven drivers wherein the arrival of a packet causes an interrupt and wherein the interrupt is serviced by processing the packet. A poll mode batch packet processor regular looks for available packets and, if there are, processes a batch.

The poll based batch packet processor is one technique for optimizing a unified core network to enable packet core user plane functions on general purpose servers. General purpose servers can be even less expensive than dedicated user plane switching fabrics designed for use within SDNs.

A unified core leveraging SDN and NFV technologies can have a data plane and a control plane that are both fully virtualized. Such a unified core has its network functions decoupled from its hardware and can thereby provide a service-based, modular design with control plane and user plane, aka data plane, separation.

As discussed above, the unified core network is illustrated as having one of each necessary structure but in practice can have multiples of internal structures such as the HSS, UD, PCRF, PCEF, MME, and CPG. Multiples of the internal structures are more easily provisioned when they are fully virtualized and running on general purpose servers. In fact, the numbers of unified core structures can be adaptively increased and decreased. For example, during periods of low utilization the entire unified core can reside within a single general purpose server while other servers sit idle, perhaps powered down. More internal structures can be launched as the load on the unified core increases. For example, the network can detect that the CPG is reaching full capacity and respond by powering on another server, launching a new CPG within a virtual machine on the new server, and configuring the network to use the new CPG. The new CPG can either share the load of the original CPG or, being alone on the second server, take over all the CPG duties. Launching additional virtual machines and starting new servers can be automated based on the network status or on server status such as CPU usage, memory usage, number of queues, latency, etc. For example, a new server can be added to the currently running group of servers when CPU usage, memory usage, number of queues, or a combined metric passes a threshold or otherwise triggers a rule. Similarly, the network structures can be redistributed amongst the servers based on rules involving metrics such as CPU usage, memory usage, and number of queues.

As discussed, a virtualized unified core can be ramped up by powering up servers, and adding additional network structures, perhaps in VMs. Similarly, a unified core can be ramped down by consolidating VMs and network structures into smaller numbers of servers. The decisions to consolidate network structures into a smaller group of servers can be automated and based on rules involving metrics such as CPU usage, memory usage, and number of queues.

The rules for ramping up or ramping down a unified core network can be entered into the system using a configuration tool. The self organizing network (SON) structures discussed earlier can control ramping the network up and down while the configuration tool can connect to an interface on the SON structure and enter, delete, or modify rules obeyed by the SON structure.

One practiced in the art of communications would recognize the structures in the unified core network and would recognize the advantages of the unified core's structures over those of prior art LTE core networks. The unified core network provides the fault, configuration, accounting, performance, and security of the prior art networks while also providing private operators, through their partitions, with similar capabilities related to fault, configuration, accounting, performance, and security.

As discussed above, SDN provides for separation of the control plane and the data plane. The separation of the planes reduces the need for proprietary hardware. The data plane is the network element most likely to benefit from special purpose hardware but, being little more than switch fabric, benefits from competition between vendors and is subject to commoditization. The control planes of SDNs are less likely to benefit from special purpose hardware in that their processing and throughput needs are relatively low. It is the control plane of an SDN that is easiest to virtualize. With NFV, even the data planes are virtualized. Unified core networks can be completely freed of the need for proprietary hardware through the use of SDN technology. Unified core networks can be completely freed of the need for special purpose hardware through the use of NFV technology.

Unified core networks require storage, both transient and non-transient. General purpose servers provide commodity storage elements, both transient and non-transient. In some installations, general purpose servers can access non transient storage appliances, such as network attached storage, or data storage services wherein a provider provides storage as a service. For example, Amazon provides storage-as-a-service products such as "Elastic Block Store," "Elastic File System," and "Simple Storage Service." Amazon also provides database services such as "RDS," "Aurora," "DynamoDB," and "ElastiCache." The significance of the listed Amazon services is that Amazon, a cloud services provider, configures manages and maintains the servers providing those services. A user can use those cloud services instead of running its own servers. Other cloud service providers have similar offerings. A unified core network can therefore benefit from the commodity transient and non-transient storage of general purpose servers as well as any storage appliances and cloud storage/database services accessible from the general purpose server.

The general purpose servers also provide commodity compute and network hardware to the unified core network. As discussed above, commodity SDN data planes can also be used. The general purpose servers can run host operating systems that in turn run guest operating systems within hypervisors or virtual machines. The hypervisors and virtual machines can be network addressable to thereby provide virtual data place and control interfaces. Unified core network structures within those hypervisors or VMs can therefor receive and store data and can surface control interfaces that can be accessed by other LTE network structures.

What is claimed is:

1. A method for using a unified core network to provide private LTE networking capabilities to a plurality of private owners, the method comprising:
   launching a Software Defined Network (SDN) controller wherein the SDN controller is virtualized or containerized;
   provisioning a Converged Packet Gateway (CPG) wherein the unified core network comprises the CPG, wherein the CPG comprises a CPG data plane, and wherein the SDN controller configures the CPG data plane;
   provisioning a user database (UD) storing user related information wherein the unified core network comprises the UD;
   launching a Home Subscriber Server (HSS) wherein the unified core network comprises the HSS, wherein the HSS is virtualized or containerized and wherein the HSS obtains at least some of the user related data from the UD;
   launching a Mobility Management Entity (MME) wherein the unified core network comprises the MME, wherein the MME is virtualized or containerized, wherein the MME communicates with the HSS for user authentication, and wherein the MME communicates with the CPG to manage communications between user equipment (UE) and the unified core network;
   launching a Policy and Charging Rules Function entity (PCRF) wherein the unified core network comprises the PCRF, wherein the PCRF is virtualized or containerized, wherein the PCRF stores at least one rule, wherein the PCRF obtains at least some of the user related information from the UD, wherein the PCRF is partitioned into a plurality of PCRF partitions comprising a core partition, a first owner partition, and a second owner partition, wherein a unified core network operator has access to and control of the core partition, wherein the one of the private owners has access and control of only the first owner partition, wherein the another one of the private owners has access and control of only the second owner partition;
   provisioning a Policy Control Enforcement Function entity (PCEF) wherein the unified core network comprises the PCEF, wherein the PCEF comprises a PCEF data plane and wherein the PCEF enforces at least one of the at least one rule;
providing access to the CPG wherein one of the private owners deploys a first air interface that communicates with a first user equipment, wherein another one of the private owners deploys a second air interface that communicates with a second user equipment, and wherein the first user equipment and the second user equipment access the unified core network via the CPG;
monitoring a plurality of unified core network entities comprising the CPG, the SDN controller, the HSS, the MME, the PCRF, and the PCEF, detecting that one of the unified core network entities has failed, and launching or provisioning a new unified core network entity to replace the one of the unified core network entities that has failed.

2. The method of claim 1 wherein the first air interface uses the CBRS band after the unified core network has received authorization to use the CBRS band within a network cell associated with the first air interface.

3. The method of claim 1 wherein the first air interface is a Remote Radio Unit (RRU) in communication with a Base Band Unit (BBU), wherein the BBU is one of a plurality of BBUs; wherein a Virtual Remote Access Network (V-RAN) comprises the BBUs, and wherein at least one optical link provides communications between the BBUs and the unified core network.

4. The method of claim 1, wherein the first air interface is an indoor Multefire air interface deployed indoors, wherein the one of the private owners also deploys a second Multefire air interface outdoors, and wherein at least one rule stored by the PCRF determines that the first user equipment communicates with the indoor Multefire interface instead of the second Multefire air interface.

5. The method of claim 1, wherein the unified core network comprises a control plane and a data plane, wherein the control plane and the data plane are different internet protocol based networks, wherein the control plane is a software defined network and wherein the data plane is a software defined network.

6. The method of claim 1, wherein the CPG data plane and the PCEF data plane are virtualized.

7. The method of claim 1, wherein the first air interface is a Remote Radio Unit (RRU) in communication with one of a plurality of Base Band Units (BBUs), wherein a Virtual Remote Access Network (V-RAN) comprises the BBUs, and wherein the unified core network automatically instantiates an additional BBU within the V-RAN when the first private user deploys an additional RRU.

8. The method of claim 7 wherein the unified core network automatically downloads configuration data to at least two BBUs when an additional BBU is instantiated.

9. A method for using a unified core network to provide private LTE networking capabilities to a plurality of private owners, the method comprising:
launching a Software Defined Network (SDN) controller wherein the SDN controller is virtualized or containerized;
provisioning a Converged Packet Gateway (CPG) wherein the unified core network comprises the CPG, wherein the CPG comprises a CPG data plane, and wherein the SDN controller configures the CPG data plane;
provisioning a user database (UD) storing user related information wherein the unified core network comprises the UD;
launching a Home Subscriber Server (HSS) wherein the unified core network comprises the HSS, wherein the HSS is virtualized or containerized and wherein the HSS obtains at least some of the user related data from the UD;
launching a Mobility Management Entity (MME) wherein the unified core network comprises the MME, wherein the MME is virtualized or containerized, wherein the MME communicates with the HSS for user authentication, and wherein the MME communicates with the CPG to manage communications between user equipment (UE) and the unified core network;
launching a Policy and Charging Rules Function entity (PCRF) wherein the unified core network comprises the PCRF, wherein the PCRF is virtualized or containerized, wherein the PCRF stores at least one rule, wherein the PCRF obtains at least some of the user related information from the UD, wherein the PCRF is partitioned into a plurality of PCRF partitions comprising a core partition, a first owner partition, and a second owner partition, wherein a unified core network operator has access to and control of the core partition, wherein the one of the private owners has access and control of only the first owner partition, wherein the another one of the private owners has access and control of only the second owner partition;
provisioning a Policy Control Enforcement Function entity (PCEF) wherein the unified core network comprises the PCEF, wherein the PCEF comprises a PCEF data plane and wherein the PCEF enforces at least one of the at least one rule; and
providing access to the CPG wherein one of the private owners deploys a first air interface that communicates with a first user equipment, wherein another one of the private owners deploys a second air interface that communicates with a second user equipment, and wherein the first user equipment and the second user equipment access the unified core network via the CPG.

10. The method of claim 9 further comprising:
the unified core network monitoring a plurality of unified core network entities comprising the CPG, the SDN controller, the HSS, the MME, the PCRF, and the PCEF;
the unified core network detecting that one of the unified core network entities has failed; and
the unified core network launching or provisioning a new unified core network entity to replace the one of the unified core network entities that has failed.

11. The method of claim 9, wherein the first air interface includes the step of using the CBRS band after the unified core network has received authorization to use the CBRS band within a network cell associated with the first air interface, wherein the first air interface is at least one of:
a Remote Radio Unit (RRU) in communication with a Base Band Unit (BBU), wherein the BBU is one of a plurality of BBUs; wherein a Virtual Remote Access Network (V-RAN) comprises the BBUs, and wherein at least one optical link provides communications between the BBUs and the unified core network;
an indoor Multefire air interface deployed indoors, wherein the one of the private owners also deploys a second Multefire air interface outdoors, and wherein at least one rule stored by the PCRF determines that the first user equipment communicates with the indoor Multefire interface instead of the second Multefire air interface.

12. A unified core network that provides private LTE networking capabilities to a plurality of private owners, the unified core network comprising:
   a Software Defined Network (SDN) controller wherein the SDN controller is virtualized or containerized;
   a Converged Packet Gateway (CPG) wherein the unified core network comprises the CPG, wherein the CPG comprises a CPG data plane, and wherein the SDN controller configures the CPG data plane;
   a user database (UD) storing user related information wherein the unified core network comprises the UD;
   a Home Subscriber Server (HSS) wherein the unified core network comprises the HSS, wherein the HSS is virtualized or containerized and wherein the HSS obtains at least some of the user related data from the UD;
   a Mobility Management Entity (MME) wherein the unified core network comprises the MME, wherein the MME is virtualized or containerized, wherein the MME communicates with the HSS for user authentication, and wherein the MME communicates with the CPG to manage communications between user equipment (UE) and the unified core network;
   a Policy and Charging Rules Function entity (PCRF) wherein the unified core network comprises the PCRF, wherein the PCRF is virtualized or containerized, wherein the PCRF stores at least one rule, wherein the PCRF obtains at least some of the user related information from the UD, and wherein the PCRF is partitioned into a plurality of PCRF partitions comprising a core partition, a first owner partition, and a second owner partition, wherein a unified core network operator has access to and control of the core partition, wherein the one of the private owners has access and control of only the first owner partition, wherein the another one of the private owners has access and control of only the second owner partition;
   a Policy Control Enforcement Function entity (PCEF) wherein the unified core network comprises the PCEF, wherein the PCEF comprises a PCEF data plane and wherein the PCEF enforces at least one of the at least one rule;
wherein the MME approves access to the CPG by a first user equipment and a second user equipment, wherein one of the private owners deploys a first air interface that communicates with the first user equipment, wherein another one of the private owners deploys a second air interface that communicates with the second user equipment;
wherein the first user equipment access the unified core network via the first air interface and the CPG; and
wherein the second user equipment access the unified core network via the second air interface and the CPG.

13. The unified core network of claim 12, wherein the first air interface uses the CBRS band after the unified core network has received authorization to use the CBRS band within a network cell associated with the first air interface.

14. The unified core network of claim 12, further comprising at least one optical link, wherein the first air interface is a Remote Radio Unit (RRU) in communication with a Base Band Unit (BBU), wherein the BBU is one of a plurality of BBUs; wherein a Virtual Remote Access Network (V-RAN) comprises the BBUs, and wherein the at least one optical link provides communications between the BBUs and the unified core network.

15. The unified core network of claim 12, wherein the first air interface is an indoor Multefire air interface deployed indoors, wherein the one of the private owners also deploys a second Multefire air interface outdoors, and wherein at least one rule stored by the PCRF determines that the first user equipment communicates with the indoor Multefire interface instead of the second Multefire air interface.

16. The unified core network of claim 12, wherein the unified core network comprises a control plane and a data plane, wherein the control plane and the data plane are different internet protocol based networks, wherein the control plane is a software defined network and wherein the data plane is a software defined network.

17. The unified core network of claim 12, wherein the CPG data plane and the PCEF data plane are virtualized.

18. The unified core network of claim 12, wherein the first air interface is a Remote Radio Unit (RRU) in communication with one of a plurality of Base Band Units (BBUs), wherein a Virtual Remote Access Network (V-RAN) comprises the BBUs, and wherein the unified core network automatically instantiates an additional BBU within the V-RAN when the first private user deploys an additional RRU.

19. The unified core network of claim 12, wherein the unified core network automatically downloads configuration data to at least two BBUs when an additional BBU is instantiated.

20. The unified core network of claim 12, further comprising:
   an entity monitor that monitors a plurality of unified core network entities comprising the CPG, the SDN controller, the HSS, the MME, the PCRF, and the PCEF, wherein the entity monitor detects that one of the unified core network entities has failed, and wherein the unified core network launches or provisions a new unified core network entity to replace the one of the unified core network entities that has failed.

* * * * *